(12) United States Patent
Lv et al.

(10) Patent No.: US 9,380,566 B2
(45) Date of Patent: Jun. 28, 2016

(54) METHOD AND DEVICE FOR TRANSMITTING INFORMATION ON PHYSICAL UPLINK CONTROL CHANNEL

(71) Applicant: Huawei Technologies Co., Ltd., Shenzhen, Guangdong (CN)

(72) Inventors: Yongxia Lv, Shenzhen (CN); Yan Cheng, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 482 days.

(21) Appl. No.: 13/714,293

(22) Filed: Dec. 13, 2012

(65) Prior Publication Data
US 2013/0100911 A1 Apr. 25, 2013

Related U.S. Application Data

(63) Continuation of application No. PCT/CN2011/074544, filed on May 24, 2011.

(30) Foreign Application Priority Data

Jun. 13, 2010 (CN) .......................... 2010 1 0204873

(51) Int. Cl.
*H04W 72/04* (2009.01)
*H04L 1/00* (2006.01)
(Continued)

(52) U.S. Cl.
CPC ........... *H04W 72/0413* (2013.01); *H04B 7/065* (2013.01); *H04B 7/0639* (2013.01);
(Continued)

(58) Field of Classification Search
CPC . H04W 72/0413; H04B 7/0639; H04B 7/065; H04L 1/0026; H04L 1/0031; H04L 1/1812; H04L 1/0027; H04L 1/1671; H04L 1/0073; H04L 5/001; H04L 25/03898

USPC ................... 370/329, 295; 455/450
See application file for complete search history.

(56) References Cited

U.S. PATENT DOCUMENTS

2009/0196247 A1 8/2009 Fan et al.
2010/0234037 A1* 9/2010 Terry et al. .................... 455/450
(Continued)

FOREIGN PATENT DOCUMENTS

CN 101242384 A 8/2008
CN 101378307 A 3/2009
(Continued)

OTHER PUBLICATIONS

U.S. Appl. No. 61/329,743, filed Apr. 2010, Nayeb Nazar et al.*
(Continued)

*Primary Examiner* — Pao Sinkantarakorn
*Assistant Examiner* — Richard Chang
(74) *Attorney, Agent, or Firm* — Leydig, Voit & Mayer, Ltd.

(57) ABSTRACT

The present invention discloses a method and a device for transmitting information on a physical uplink control channel (PUCCH). The method includes the following steps: a user equipment (UE) selects information from channel state information (CSI) to transmit (S1); the information selected from the CSI is transmitted on the PUCCH with one or both of hybrid automatic retransmission acknowledgment information and a scheduling request (S2), which enables a base station to obtain not only the information in the CSI but also one or both of the hybrid automatic retransmission acknowledgement information and the scheduling request from the PUCCH. The present invention avoids the problem of system downlink throughput degradation caused by dropping all CSI by the UE in the prior art, and avoids the problem that system downlink throughput is influenced by unnecessary data retransmission on a downlink carrier caused by ACK/NACK bundling among carriers.

20 Claims, 7 Drawing Sheets

(51) Int. Cl.
*H04L 1/18* (2006.01)
*H04L 1/16* (2006.01)
*H04B 7/06* (2006.01)
*H04L 5/00* (2006.01)
*H04L 25/03* (2006.01)

(52) U.S. Cl.
CPC ............ *H04L1/0026* (2013.01); *H04L 1/0027* (2013.01); *H04L 1/0031* (2013.01); *H04L 1/0073* (2013.01); *H04L 1/1671* (2013.01); *H04L 1/1812* (2013.01); *H04L 5/001* (2013.01); *H04L 25/03898* (2013.01)

(56) References Cited

U.S. PATENT DOCUMENTS

| | | | | |
|---|---|---|---|---|
| 2010/0311431 | A1* | 12/2010 | Papasakellariou | H04B 1/713 455/450 |
| 2011/0228877 | A1* | 9/2011 | Han et al. | 375/295 |
| 2011/0249578 | A1* | 10/2011 | Nayeb Nazar | H04L 1/0027 370/252 |

FOREIGN PATENT DOCUMENTS

| CN | 101383683 A | 3/2009 |
|---|---|---|
| CN | 101572591 A | 11/2009 |
| WO | WO 2009/100069 A2 | 8/2009 |
| WO | WO 2010018977 A2 | 2/2010 |
| WO | WO 2010058979 A2 | 5/2010 |

OTHER PUBLICATIONS

Extended European Search Report in corresponding European Patent Application No. 11795064.2 (Jun. 3, 2013).

"CDM Based Control Signal multiplexing w/ and w/o additional RS," 3GPP TSG RAN WG1 Meeting #47bis, Jan. 2007, No. R1-070392, 3rd Generation Partnership Project, Valbonne, France.

Written Opinion of the International Searching Authority in corresponding PCT Patent Application No. PCT/CN2011/074544 (Sep. 1, 2011).

International Search Report in corresponding PCT Patent Application No. PCT/CN2011/074544 (Sep. 1, 2011).

"R1-091242—Multiplexing of ACK/NACK, CQI & SR in LTE-A," 3GPP TSG RAN WG1 Meeting #56bis, Mar. 23-27, 2009, 3GPP, Valbonne, France.

"R1-104284—Simultaneous transmission of uplink channels or signals," 3GPP TSG RAN WG1 Meeting #62, Aug. 23-27, 2010, 3GPP, Valbonne, France.

$1^{st}$ Office Action in corresponding Chinese Patent Application No. 201010204873.6 (Mar. 11, 2013).

"$3^{rd}$ Generation Partnership Project; Technical Specification Group Radio Access Network; Evolved Universal Terrestrial Radio Access(E-UTRA); Physical layer procedures(Release 9)," 3GPP TS 36.213, V9.2.0, $3^{rd}$ Generation Partnership Project, Valbonne, France (Jun. 2010).

* cited by examiner

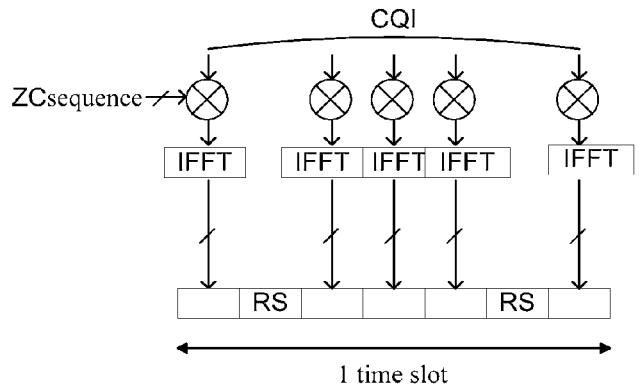

Fig.4

501
Base station generates high layer parameters, and sends the high layer parameters to a UE

502
The UE receives the high layer parameters sent by the base station, and selects information from channel state information according to the high layer parameters

503
The UE jointly codes and maps the information selected from CSI and ACK/NACK information bits to a data symbol of PUCCH for transmission when both of ACK/NACK and periodical CSI are needed for feedback simultaneously

504
The UE utilizes orthogonal spreading code to modulate the pilot symbol of physical uplink control channel

505
The base station determines the channel state information to be detected

506
Performs channel decoding on the data transmitted on a data symbol of the second PUCCH, and reads the determined channel state information to be detected and ACK/NACK information according to preset ordering rule

Fig.5

METHOD AND DEVICE FOR TRANSMITTING INFORMATION ON PHYSICAL UPLINK CONTROL CHANNEL

CROSS-REFERENCE TO RELATED APPLICATIONS

This application is a continuation of International Patent Application No. PCT/CN2011/074544, filed on May 24, 2011, which claims priority to Chinese Patent Application No. 201010204873.6, filed on Jun. 13, 2010, both of which are hereby incorporated by reference in their entireties.

FIELD OF THE INVENTION

The present invention relates to the field of communication technology, and in particular relates to a method of transmitting information on physical uplink control channel (PUCCH).

BACKGROUND

Long Term Evolution-Advanced (LTE-A) system is a further evolved and enhanced 3rd Generation Partnership Project (3GPP) LTE system. In the LTE-A system, in order to meet the International Telecommunication Union (ITU)'s requirement for peak data rate for the 4th generation communication technology, carrier aggregation (CA) is introduced. In the carrier aggregation, frequency spectrum of two or more Component Carriers (CC) are aggregated to obtain a broader transmission bandwidth, wherein each component carrier can be configured to be compatible with LTE system, each component carrier has independent Hybrid Automatic Repeat Request (HARQ) procedure; the User Equipment (UE) in LTE-A can simultaneously access multiple component carriers for data receiving and transmitting according to the UE's capability and traffic requirements.

In the 3GPP LTE system, in order to support the technologies including dynamic scheduling, Multiple-Input and Multiple-Output (MIMO) and Hybrid Automatic Repeat Request etc., the terminal needs to feed back Uplink Control Information (UCI) to the base station on Physical Uplink Control Channel (PUCCH), for example: Channel Quality Indicator (CQI), Precoding Matrix Indicator (PMI), Rank Indication (RI), Acknowledgment/Negative Acknowledgement (ACK/NACK) and Scheduling Request (SR) etc. Wherein, CQI, PMI and RI are generally referred to as Channel State Information (CSI). The system reserves PUCCH for channel state information, hybrid automatic repeat request acknowledgement information and SR respectively, and the UE feeds back UCI on corresponding PUCCH.

In the prior art 1, when the UE needs to feed back ACK/NACK or SR in the LTE-A system, and at the same time the UE needs to send CSI to the base station based on configured CSI feedback periodicity, that is to say when the UE needs to transmit CSI and ACK/NACK on PUCCH simultaneously, or, when the UE needs to transmit CSI and SR at the same time, the UE has to drop all the CSI, and transmits ACK/NACK or SR only on the PUCCH for ACK/NACK or SR.

The study of the prior art 1 founds: under carrier aggregation in the LTE-A system, the probability of simultaneously feeding back CSI and ACK/NACK by UE is high, if dropping all the CSI all the time, in this case: on the one hand, the base station cannot obtain the quality of the downlink channel, so that the base station cannot schedule accurately, and influence the downlink throughput of the system; on the other hand, if dropping all the CSI, in order to obtain the quality of the downlink channel, the base station probably needs to trigger non-periodical CSI feedback of UE by using physical downlink control channel for reporting on Physical Uplink Shared Channel (PUSCH), which will increase system resource overhead.

In the prior art 2, in LTE-A system, when the UE feeds back ACK/NACK according to the downlink data sent from the base station, and at the same time the UE needs to send CSI to the base station based on configured CSI feedback periodicity, that is to say when the UE needs to simultaneously transmit CSI and ACK/NACK on PUCCH, it bundles the ACK/NACK into 2 bits or 1 bit, and then sends them with CSI. The so-called ACK/NACK bundling implements logical AND operation for hybrid automatic repeat request information to be bundled, for example, if the hybrid automatic repeat request acknowledgement information to be feedback for one carrier is ACK and the hybrid automatic repeat request acknowledgement information to be feedback for another carrier is NACK, the result of bundling is NACK. Another example: assume that the number of the downlink aggregate carriers for UE is 2, and the transfer mode for each downlink carrier is closed-loop spatial multiplexing, in this case, the UE needs to feed back hybrid automatic repeat request acknowledgement information for both of these two downlink carriers, and for each downlink carrier, both of the ACK/NACK for the first code word and second code word are needed for feedback. According to the prior art, when the subframe for feeding back CSI also needs to simultaneously feed back ACK/NACK, bundling the hybrid automatic repeat request acknowledgement information, more specifically, bundling the ACK/NACK for the first code word and the ACK/NACK for the second code word for each downlink carrier respectively, and eventually get 2 bits of hybrid automatic repeat request acknowledgement information, the UE transmits the obtained 2 bits of ACK/NACK with CSI in certain way.

The study of the prior art 2 founds: under carrier aggregation in the LTE-A system, there is the circumstance that the channel correlation of several aggregated downlink carriers is low, the low channel correlation of two carriers means that the correlation between correct data and incorrect data transmitted on those two downlink carriers is also low, so that the probability of transmitting the correct data on one carrier and the incorrect data on the other carrier is high, if bundling the ACK/NACK of two carriers all the time, the result will always be NACK, so that there is no need to retransmit the data for both of the downlink carriers. So, bundling ACK/NACK all the time influences system downlink throughput, and increases system resource overhead due to the unnecessary downlink data retransmission.

SUMMARY

The embodiments of the present invention provides methods and apparatus for transmitting information on physical uplink control channel, the present invention avoids the problem of system downlink throughput decrease caused by dropping all CSI, and avoids the problem that system downlink throughput is influenced by unnecessary data retransmission on a downlink carrier caused by ACK/NACK bundling among carries.

An embodiment of the present invention provides a method for transmitting information on physical uplink control channel, the method comprises:

selecting information from channel state information;

transmitting the information selected from the channel state information on physical uplink control channel together with one or both of hybrid automatic repeat request acknowledgement information and scheduling request;

wherein the selecting information from the channel state information further comprises:

selecting wideband channel quality indicator and precoding matrix indicator from the channel state information, or selecting wideband channel quality indicator from the channel state information, or selecting precoding matrix indicator from the channel state information, or selecting subband channel quality indicator and subband position indicator from the channel state information, or selecting subband channel quality indicator, subband position indicator, and precoding matrix indicator from the channel state information.

An embodiment of the present invention provides a method for transmitting information on a physical uplink control channel, the method comprises:

mapping a first part of information bits in hybrid automatic repeat request acknowledgement information bits to a modulated symbol according to a predetermined constellation point mapping rule;

mapping the modulated symbol to a pilot symbol of the physical uplink control channel for transmission;

jointly coding and mapping a second part of information bits in the hybrid automatic repeat request acknowledgement information bits and channel state information to a data symbol of the physical uplink control channel for transmission.

An embodiment of the present invention provides a method for transmitting information on physical uplink control channel, the method comprises:

jointly coding and mapping channel state information and hybrid automatic repeat request acknowledgement information to a first physical uplink control channel for transmission when an user equipment needs to transmit the channel state information and the hybrid automatic repeat request acknowledgement information simultaneously;

mapping the channel state information to a second physical uplink control channel for transmission when the user equipment only transmits the channel state information, wherein the first physical uplink control channel is the physical uplink control channel allocated to the user equipment by a base station or network for transmitting the hybrid automatic repeat request acknowledgement information, and the second physical uplink control channel is the physical uplink control channel allocated to the user equipment by the base station or network for transmitting the channel state information.

An embodiment of the present invention provides a method for obtaining information transmitted on a physical uplink control channel, the method comprises:

determining channel state information to be detected;

obtaining the determined channel state information to be detected on the physical uplink control channel, and obtaining one or both of hybrid automatic repeat request acknowledgement information and scheduling request on the physical uplink control channel;

wherein the determining the channel state information to be detected further comprises:

determining the channel state information to be detected as wideband channel quality indicator and precoding matrix indicator, or determining the channel state information to be detected as wideband channel quality indicator, or determining the channel state information to be detected as precoding matrix indicator, or determining the channel state information to be detected as subband channel quality indicator and subband position indicator, or determining the channel state information to be detected as subband channel quality indicator, subband position indicator, and precoding matrix indicator.

An embodiment of the present invention provides a method for obtaining information transmitted on a physical uplink control channel, the method comprises:

obtaining a first part of information bits in hybrid automatic repeat request acknowledgement information bits from a pilot symbol on the physical uplink control channel;

obtaining a second part of information bits in the hybrid automatic repeat request acknowledgement information bits and channel state information from a data symbol on the physical uplink control channel.

An embodiment of the present invention provides a method for obtaining information transmitted on a physical uplink control channel, the method comprises:

determining whether an user equipment is transmitting channel state information and hybrid automatic repeat request acknowledgement information simultaneously, and if so, obtaining the channel state information and the hybrid automatic repeat request acknowledgement information on a first physical uplink control channel; and if not, obtaining the channel state information on a second physical uplink control channel;

wherein the first physical uplink control channel is the physical uplink control channel allocated to the user equipment by a base station or network for transmitting the hybrid automatic repeat request acknowledgement information, and the second physical uplink control channel is the physical uplink control channel allocated to the user equipment by the base station or network for transmitting the channel state information.

An embodiment of the present invention provides a apparatus for transmitting information on a physical uplink control channel, the apparatus comprises:

a selection module configured for selecting information from channel state information, wherein the selecting the information from the channel state information further comprises:

selecting wideband channel quality indicator and precoding matrix indicator from the channel state information, or selecting wideband channel quality indicator from the channel state information, or selecting precoding matrix indicator from the channel state information, or selecting subband channel quality indicator and subband position indicator from the channel state information, or selecting subband channel quality indicator, subband position indicator, and precoding matrix indicator from the channel state information; and a transmission module configured for transmitting the information selected from the channel state information on the physical uplink control channel together with one or both of hybrid automatic repeat request acknowledgement information and scheduling request.

An embodiment of the present invention provides a apparatus for transmitting information on physical uplink control channel, the apparatus comprises:

a first mapping and transmission module configured for mapping a first part of information bits in hybrid automatic repeat request acknowledgement information bits to a modulated symbol according to a predetermined constellation point mapping rule, and mapping the modulated symbol to a pilot symbol on the physical uplink control channel for transmission;

a second mapping and transmission module configured for jointly coding and mapping a second part of information bits in the hybrid automatic repeat request acknowledgement information bits and channel state information to a data symbol on the physical uplink control channel for transmission.

An embodiment of the present invention provides an apparatus for transmitting information on physical uplink control channel, the apparatus comprises:

a third mapping and transmission module configured for jointly coding and mapping channel state information and hybrid automatic repeat request acknowledgement information to a first physical uplink control channel for transmission, when an user equipment needs to transmit the channel state information and the hybrid automatic repeat request acknowledgement information simultaneously, wherein the first physical uplink control channel is a physical uplink control channel allocated to the user equipment by a base station or network for transmitting the hybrid automatic repeat request acknowledgement information;

a fourth mapping and transmission module configured for mapping the channel state information to a second physical uplink control channel for transmission, when the user equipment only transmits the channel state information, wherein the second physical uplink control channel is the physical uplink control channel allocated to the user equipment by the base station or network for transmitting the channel state information.

An embodiment of the present invention provides an apparatus for obtaining information transmitted on a physical uplink control channel, the apparatus comprises:

a determining module configured for determining channel state information to be detected, wherein the determining channel state information to be detected further comprises:

determining the channel state information to be detected as wideband channel quality indicator and precoding matrix indicator, or determining the channel state information to be detected as wideband channel quality indicator, or determining the channel state information to be detected as precoding matrix indicator, or determining the channel state information to be detected as subband channel quality indicator and subband position indicator, or determining the channel state information to be detected as subband channel quality indicator, subband position indicator, and precoding matrix indicator.

an obtaining module configured for obtaining the determined channel state information to be detected on the physical uplink control channel, and obtain one or both of hybrid automatic repeat request acknowledgement information and scheduling request on the physical uplink control channel.

An embodiment of the present invention provides an apparatus for obtaining information transmitted on a physical uplink control channel, the apparatus comprises: a first obtaining module and a second obtaining module;

the first obtaining module configured for obtaining a first part of information bits in hybrid automatic repeat request acknowledgement information bits on a pilot symbol on the physical uplink control channel;

the second obtaining module configured for obtaining a second part of information bits in hybrid automatic repeat request acknowledgement information bits and channel state information from a data symbol on the physical uplink control channel.

An embodiment of the present invention provides an apparatus for obtaining information transmitted on a physical uplink control channel, the apparatus comprises a determining module, a third obtaining module and a fourth obtaining module;

the determining module configured for determining whether an user equipment is transmitting channel state information and hybrid automatic repeat request acknowledgement information simultaneously, the third obtaining module configured for obtaining the channel state information and the hybrid automatic repeat request acknowledgement information on a first physical uplink control channel, when it is determined that the user equipment is transmitting channel state information and hybrid automatic repeat request acknowledgement information simultaneously;

the fourth obtaining module configured for obtaining the channel state information on a second physical uplink control channel, when it is determined that the user equipment is only transmitting the channel state information;

wherein the first physical uplink control channel is the physical uplink control channel allocated to the user equipment by a base station or network for transmitting the hybrid automatic repeat request acknowledgement information, and the second physical uplink control channel is the physical uplink control channel allocated to the user equipment by the base station or network for transmitting the channel state information.

In the technical solutions provided in the embodiments of the present invention, UE can select information from CSI for transmitting, simultaneously transmitting the information selected from the CSI together with one or both of hybrid automatic repeat request acknowledgement information and scheduling request on a physical uplink control channel so that the base station can not only obtaining information from CSI on PUCCH, but also can obtain one of both of hybrid automatic repeat request acknowledgement information and scheduling request. It avoids the problem of system downlink throughput decrease caused by dropping all CSI by the UE in prior art, and avoids the problem that system downlink throughput is influenced by unnecessary data retransmission on a downlink carrier caused by ACK/NACK bundling among carries, simultaneously transmitting the information selected in CSI together with ACK/NACK or SR not only guarantees the performance of ACK/NACK or SR, but also obtains some channel quality information, reduces the influence on system throughput, and avoids additional resources overhead.

BRIEF DESCRIPTION OF THE DRAWINGS

In order to illustrate the technical solutions in the embodiments of the present invention more clearly, a brief introduction for each figures used in embodiments will be had from the following description. Obviously, the following figures are only some embodiments of this invention, those skilled in the art may get other figures based on present figures of this invention without creative effort.

FIG. 4 is a structure of PUCCH channel;

FIG. 5 is a flowchart of a method for transmitting information on physical uplink control channel according to another embodiment of the present invention;

DETAILED DESCRIPTION

Figure 1:
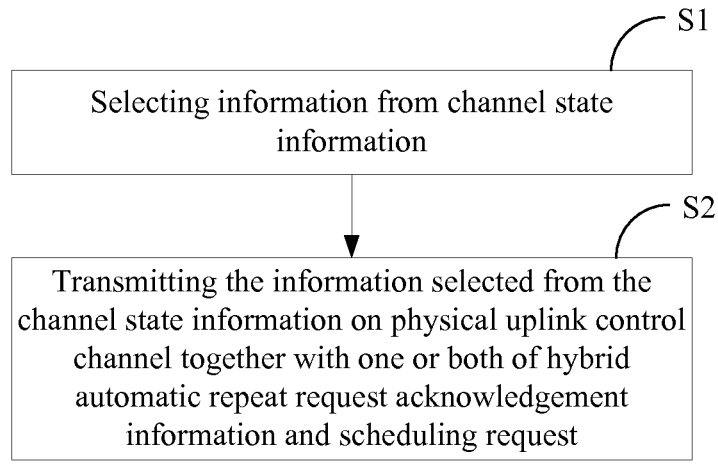
FIG. 1 is a flowchart of a method for transmitting information on physical uplink control channel according to an embodiment of the present invention.

The embodiments of the present invention provide methods for transmitting information on physical uplink control channel, the embodiments of the present invention also provide corresponding apparatus. Before further introduction of the embodiments of present invention, here will give some necessary introduction of the terminologies involved in the present application first, as follows:

Channel State Information (CSI) is used to support dynamic scheduling and MIMO technology, it is periodically feed back on PUCCH, it can be divided into two types of feedback, the main feature of the first type of feedback is there is only wideband channel state information feedback (different reporting modes report different content, for example, mode 1-0 reports wideband CQI only, mode 1-1 reports wideband CQI and PMI), it is usually referred to as wideband CQI feedback (although it is referred to as wideband CQI feedback for simplification purpose, it's actually corresponding to wideband channel state information feedback, for example, PMI can be reported in mode 1-1 also); the main feature of the second type of feedback is there are both the wideband channel state information feedback (different reporting modes report different content, for example, mode 2-0 reports wideband CQI only, mode 2-1 reports wideband CQI, the spatial differential CQI and PMI) and subband channel state information feedback (different reporting modes report different content, for example, mode 2-0 reports subband CQI and the subband position indication only, mode 2-1 reports subband CQI, the spatial differential CQI and the subband position indication), and using different subframes (the subframe used to report wideband channel state information is referred to as wideband CQI subframe and wideband CQI/PMI subframe respectively in mode 2-0 and mode 2-1, the subframe used to report subband channel state information is referred to as selected CQI subframe in both the mode 2-0 and mode 2-1), it is usually referred to as frequency-selective CQI feedback (although it is referred to as CQI feedback for simplification purpose, it's actually corresponding to channel state information feedback, for example, PMI can also be reported in mode 2-1). The periodical CSI feedback can be referred to as periodical CQI feedback for simplification purpose. The periodicity for the periodical CQI feedback is determined by high layer parameters, the two minimal feedback periodicities are 2 ms and 5 ms. In the LTE-A system, new precoding matrix (which is referred to as codebook) is introduced due to the introduction of enhanced downlink MIMO technology, such as double-codebook, the double-codebook may include codebook 1 and codebook 2, the codebook 1 is a wideband codebook (or wideband precoding matrix) or a long-term codebook (or long-term precoding matrix), codebook 2 is a subband codebook (or subband precoding matrix) or a short-term codebook (or short-term precoding matrix), or the codebook 2 is a wideband codebook (or wideband precoding matrix) or a long-term codebook (or long-term precoding matrix), the codebook 1 is a subband codebook (or subband precoding matrix) or a short-term codebook (or short-term precoding matrix). It probably introduces a new channel state information reporting mode for periodical CSI feedback due to the introduction of new precoding matrix, the codebook 1 and codebook 2 can be reported on the same subframe or on different subframes. In the LTE-A system, because of the introduction of carrier aggregation technology, it is necessary to feed back channel state information on uplink channel for each component carrier when user equipment simultaneously accesses multiple component carriers for receiving downlink data. It usually utilizes Time Division Multiplexing (TDM) to report channel state information feedback for multiple downlink carriers, that is to say one subframe usually needs to report CSI of one downlink carrier only. Different transmission modes for downlink carriers report different content, if the periodical CSI reporting mode for each downlink carrier in LTE-A system is the same as the reporting mode in LTE Rel-8, then the maximum size for channel state information feedback is 11 bits. When the number of downlink aggregated carriers is more than 3 or equal to 3, and the channel state information feedback periodicity for one or more downlink carriers is 2 ms, it is impossible to report the CSIs for multiple downlink carriers in terms of TDM without any collision, it needs to report the channel state information for two or three downlink carriers on one subframe, the total number of information bits for feedback by the subframe which report the channel state information for two or three downlink carriers increases substantially.

The hybrid automatic repeat request acknowledgement information is used to support Hybrid Automatic Repeat Request (HARQ) technology. In this technology, data receiver needs to feed back response message to data sender to aid in confirming whether the data is received correctly. The response message can be Acknowledgement (ACK), Negative-acknowledgement (NACK) or Discontinuous Transmission (DTX). Wherein ACK means the data is received correctly, NACK means the data is received incorrectly, and DTX means it failed to receive data. In the LTE-A system, data transmission on each downlink component carrier PDSCH needs to feed back corresponding response message due to the introduction of the carrier aggregation. The number of bits needs to be fed back for hybrid automatic repeat request acknowledgement information for multiple downlink carriers depends on the number of downlink component carriers configured by the base station for the user or the number of carriers actually scheduled by the base station, when it depends on the former one, once the base station schedules downlink carriers for the user, the user needs to calculate the total number of ACK/NACK information bits for feedback based on the number of downlink component carriers for the user, the LTE-A system needs to support up to 10 bits of ACK/NACK feedback when there is no need for DTX display notification.

Scheduling Request (SR) information is used to request transmission of uplink data recourses from user equipment to base station. In the LTE system, SR information can be a Positive SR or a Negative SR, wherein the positive SR means the user equipment requests uplink recourses to the base station, and the negative SR means the user equipment doesn't request uplink resources. SR information is transmitted on PUCCH when there is only SR.

In the LTE-A system, because of the introduction of carrier aggregation, when the user equipment simultaneously accesses multiple component carriers for receiving downlink data, it is necessary to feed back channel state information on uplink channel for each component carrier, and it is necessary to feed back corresponding response message for the data transmission on the Physical Downlink Shared Channel (PDSCH) for each downlink component carrier. Since the SR information is used to request uplink recourses to the base station, it is only related to traffic requirements and is not related to the number of component carriers accessed, so one SR for each user equipment would be enough. UE needs to feed back channel state information for multiple downlink carriers, ACK/NAC information for multiple downlink carriers and SR information on one uplink carrier.

Note that in the embodiment of present invention, the first physical uplink control channel is the physical uplink control channel allocated to the user equipment by the base station or network for transmitting hybrid automatic repeat request acknowledgement information; it can be pre-reserved, implicit corresponded, or explicitly notified by the base station; the PUCCH format for the first physical uplink control channel can be Format 2, or Discrete Fourier Transform-spread-Orthogonal frequency-division multiplexing (OFT-S-OFDM), or other formats.

In the embodiments of present invention, the second physical uplink control channel is the physical uplink control channel allocated to the user equipment by the base station or network for transmitting channel state information (CSI, or referred to as CQI by those skilled in the art). The explanation for the second physical uplink control channel is the same as the explanation for first physical uplink control channel, that is to say the second physical uplink control channel can be pre-reserved, implicit corresponded, or explicitly notified by the base station; the PUCCH format can be PUCCH Format 2, or DFT-S-OFDM, or other formats.

Above text is some necessary explanation on some objects processed in the methods provided in the embodiment of present invention, it helps to understand the following method for transmitting information on physical uplink control channel.

As shown in FIG. 1, it is a flowchart of a method for transmitting information on physical uplink control channel according to the embodiment of present invention, the method comprises:

Step S1: selecting information from channel state information; wherein the selecting information from channel state information further comprises:

selecting wideband channel quality indicator and precoding matrix indicator from the channel state information, or selecting wideband channel quality indicator from the channel state information, or selecting precoding matrix indicator from the channel state information, or selecting subband channel quality indicator and subband position indicator from the channel state information, or selecting subband channel quality indicator, subband position indicator, and precoding matrix indicator from the channel state information.

In the step S1, the UE selects information from the channel state information further comprises: the UE selects information from the channel state information according to the received high layer parameters transmitted by the base station or according to a preset rule.

The precoding matrix indication in this step can be wideband precoding matrix indication, or long-term precoding matrix indication, or subband precoding matrix indication, or short-term precoding matrix indication, or wideband precoding matrix indication and subband precoding matrix indication, or long-term precoding matrix indication and short-term precoding matrix indication.

Step S2: transmitting the information selected in CSI on PUCCH together with one or both of hybrid automatic repeat request acknowledgement information (or referred to as ACK/NACK by those skilled in the art) and SR.

Note that, different channel state information reporting modes need different channel state information as feedback, the information selected from the channel state information by UE in the step S1 is also different, take UE in closed-loop spatial multiplexing transmission mode for example, the information selected from CSI in step S1 includes wideband CQI and PMI, or includes PMI only, or includes wideband CQI only, or includes subband CQI and subband label, or includes other information which can indicate channel state information, herein it should not be construed as the exhaustion of CSI. Meanwhile, the selected channel state information could correspond to one downlink carrier, or it could correspond to multiple downlink carriers. For example, when it needs to feed back channel state information for two downlink carriers on one uplink subframe under carrier aggregation, the information selected from the channel state information can be wideband CQI for carrier 1 and wideband CQI for carrier 2.

Wherein, the high layer parameters in step S1 is notified by the base station to UE. There is no limitation for the specific format for the high layer parameters in present invention, for example, 3 bits field can be used to indicate the high layer parameters. There is no limitation for which part the high layer parameter should be added in high layer parameter list, for example, it can be added to high layer parameter list reported by CSI, which is used to configure carrier, or it can be added to high layer parameter list, which is used to indicate the structure of PUCCH. There is no limitation for preset rule in step S1, for example, when CQI is transmitted together with ACK/NACK, transmitting the wideband CQI and PMI information in the channel state information together with ACK/NACK on PUCCH.

Transmitting ACK/NACK and/or SR together with the information selected from CSI on PUCCH in the step S2 can be implemented in different manner, more detailed information will be given in later method embodiments of present invention.

An embodiment of present invention provides a method for transmitting information on physical uplink control channel, when UE needs to feed back ACK/NACK or SR, and at the same time UE needs to send CSI to the base station based on configured CSI feedback periodicity, that is to say when UE needs to simultaneously transmit CSI and ACK/NACK on PUCCH, or, when the UE needs to transmit CSI and SR simultaneously, transmitting ACK/NACK and/or SR together with the information selected from CSI on PUCCH avoids the problem of system downlink throughput decrease caused by dropping all CSI, and avoids the problem that system downlink throughput is influenced by unnecessary data retransmission on a downlink carrier caused by ACK/NACK bundling among carriers, simultaneously transmitting the information selected from CSI together with ACK/NACK or SR not only guarantees the performance of ACK/NACK or SR, but also obtains some channel quality information, reduces the influence on system throughput, and avoids additional resources overhead.

Figure 2:
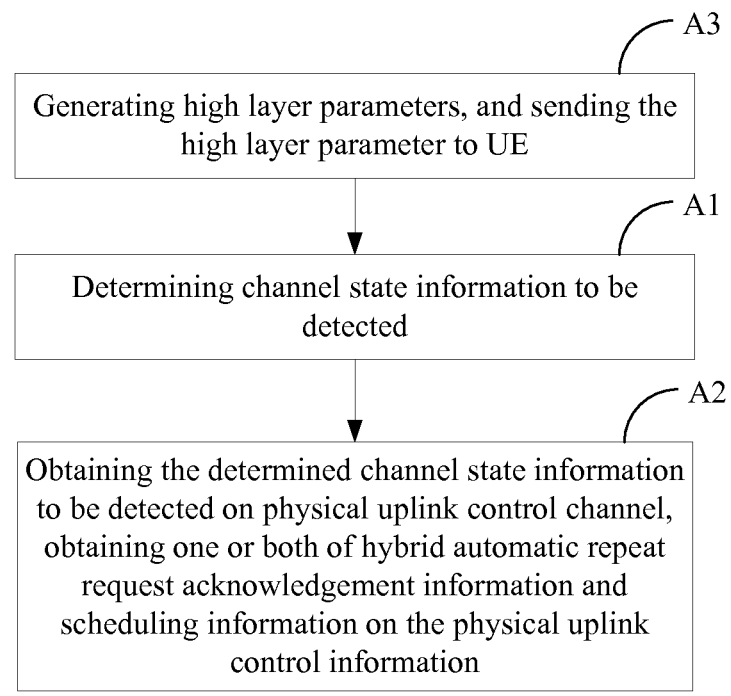
FIG. 2 is a flowchart of a method for obtaining information transmitted on physical uplink control channel according to another embodiment of the present invention.

As shown in FIG. 2, it is a flowchart of a method for obtaining information transmitted on physical uplink control channel, the method comprises:

Step A1: determining channel state information to be detected further comprises: determining the channel state information to be detected as wideband channel quality indicator and precoding matrix indicator, or determining the channel state information to be detected as wideband channel quality indicator, or determining the channel state information to be detected as precoding matrix indicator, or determining the channel state information to be detected as subband channel quality indicator and subband position indicator, or determining the channel state information to be detected as subband channel quality indicator, subband position indicator, and precoding matrix indicator.

The precoding matrix indication in this step can be wideband precoding matrix indication, or long-term precoding matrix indication, or subband precoding matrix indication, or short-term precoding matrix indication, or wideband precoding matrix indication and subband precoding matrix indication, or long-term precoding matrix indication and short-term precoding matrix indication.

The specific operations for determining the channel state information to be detected in step A1 further comprises: determining channel state information to be detected according to high layer parameters configured for the user or preset rule.

The high layer parameters in step A1 are the high layer parameters configured by the base station for UE. There is no limitation for the specific format of high layer parameters in present invention, for example, 3 bits field can be used to indicate the high layer parameters. There is no limitation for which part the high layer parameter should be added in the high layer parameter list, for example, it can be added to high layer parameter list reported by CSI, which is used to configure carriers, or it can be added to high layer parameter list, which is used to indicate the structure of PUCCH. There is no limitation for preset rule in step A1, for example, when CQI is transmitted together with ACK/NACK, transmitting wideband CQI and PMI in the channel state information together with ACK/NACK on PUCCH.

Step A2: obtaining the determined channel state information to be detected on PUCCH, and obtaining one or both of hybrid automatic repeat request acknowledgement information (or ACK/NACK for short) and/or SR on PUCCH;

Transmitting ACK/NACK and/or SR together with the determined channel state information to be detected on PUCCH by UE can be implemented in different manner, the operation for obtaining ACK/NACK and/or SR together with the determined channel state information to be detected on PUCCH by the base station in step A2 is different, more detailed information about obtaining ACK/NACK and/or SR together with the determined channel state information to be detected on PUCCH by the base station will be given later embodiments of present invention.

Further, before step A1 shown in FIG. 2, further comprises:

Step A3: generating the high layer parameters, and transmitting the high layer parameters to the UE;

In this step, the base station mainly configures multiplexing mode of channel state information, hybrid automatic repeat request acknowledgement information and/or scheduling request by using high layer parameters. This step is optional in present invention, for example, this step can be omitted when performing a multiplexing of channel state information, hybrid automatic repeat request acknowledgement information and/or scheduling request according to preset rules based on protocol specifications.

In the step A3, there is no limitation on the basis of high layer parameters generation by the base station, for example, high layer parameters can be generated based on the performance of PUCCH, so that UE is indicated to use corresponding multiplexing mode of channel state information, hybrid automatic repeat request acknowledgement information and/or scheduling request. There is no limitation on the specific format of high layer parameter generation by base station either, for example, 3 bits field can be used to indicate high layer parameters. There is no limitation on how to inform UE about this high layer parameter by the base station, for example, the base station can add high layer parameters to high layer parameter list reported by CSI, which is used to configure carriers, and send to UE, or, the high layer parameters can be added to high layer parameter list, which is used to indicate the structure of PUCCH, and send to UE.

Here takes an example of configuring channel state information and hybrid automatic repeat request acknowledgement information according to high layer parameters by base station, to explain step A3, comprises:

The base station configures the multiplexing mode of CSI and ACK/NACK according to the performance of PUCCH in one of the following ways:

Mode 1: keeping wideband CQI and PMI, and transmitting with ACK/NACK simultaneously;

Mode 2: keeping PMI, and transmitting with ACK/NACK simultaneously;

Mode 3: keeping wideband CQI, and transmitting with ACK/NACK simultaneously;

Mode 4: keeping subband CQI and subband label, and transmitting with ACK/NACK simultaneously;

Mode 5: keeping subband channel quality indicator, subband position indicator and precoding matrix indicator in channel state information, and transmitting with ACK/NACK simultaneously.

Wherein, the performance of PUCCH can be the performance of PUCCH format transmitting CSI, or the performance of PUCCH format transmitting ACK/NACK, for example, the performance of PUCCH Format 2 or Discrete Fourier Transform-spread-Orthogonal frequency-division multiplexing (DFT-S-OFDM). When the performance of PUCCH is good, the subframe used for transmitting wideband channel state information uses mode 1, the subframe used for transmitting subband channel state information uses mode 4; if the performance of PUCCH is normal, the subframe used for transmitting wideband channel state information uses mode 2 or mode 3, the subframe used for transmitting subband channel state information uses mode 4.

Similarly, the specific mode for indicating the multiplexing mode of SR and CSI by using high layer parameters can be referred to above multiplexing mode of ACK/NACK and CSI by using high layer parameters.

Wherein, the prior art 1 and the prior art 2 can also be used as alternative multiplexing mode of ACK/NACK and CSI and/or SR by using high layer parameters, for example, mode 6 is a mode for dropping CSI and only transmitting ACK/NACK or SR according to prior art 1, mode 6 is a mode for bundling ACK/NACK and simultaneously transmitting ACK/NACK with CSI according to prior art 2.

Figure 3:
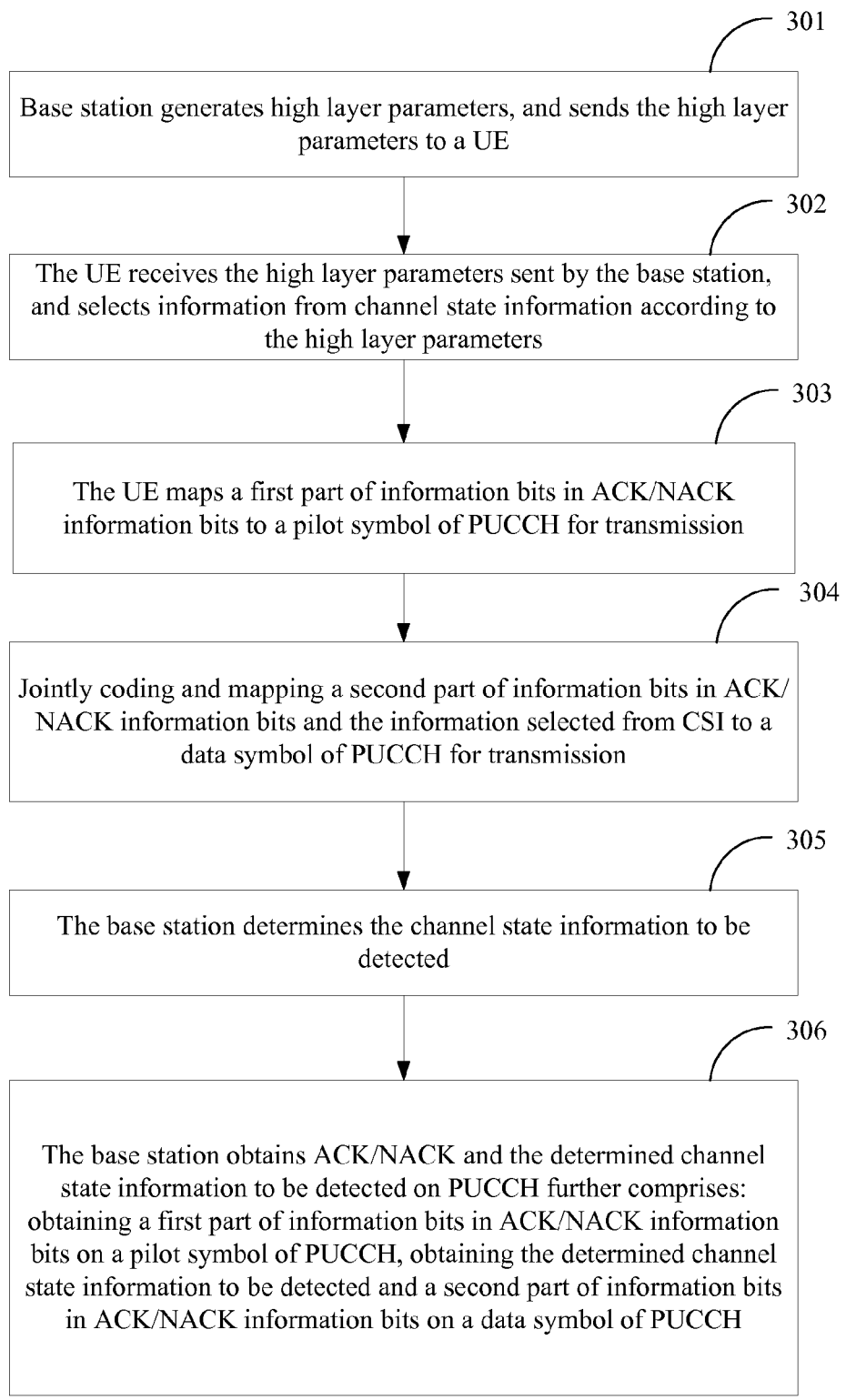
FIG. 3 is a flowchart of a method for transmitting information on physical uplink control channel according to another embodiment of the present invention.

As shown in FIG. 3, it is a flowchart of a method for transmitting information on physical uplink control channel, this method will focus on simultaneously transmitting ACK/NACK and CSI (or referred to as CQI by those skilled in the art), the method comprises:

Step 301: a base station generates high layer parameters, and sends the high layer parameters to a UE; this step is the same as the step A3 in FIG. 2, detailed explanation can be referred to the explanation of step A3, so the detailed description is omitted herein.

Step 302: the UE receives the high layer parameters sent by the base station, and selects information from channel state information according to the high layer parameters; this step is the same as step S1 in FIG. 1, detailed explanation can be referred to the explanation of step S1, so the detailed description is omitted herein.

Note that, in the step 302, when the subframe for ACK/NACK feedback is also needed for periodical CSI feedback, the operation of selecting information from channel state information can be based on the preset rule described in step S1 rather than the high layer parameters (detailed information can be referred to step S1), in this case, step 301 can be omitted.

Step 303: the UE maps the first part of information bits in ACK/NACK information bits to a pilot symbol of PUCCH for transmission, wherein the PUCCH is the second physical uplink control channel (also referred to as the PUCCH for transmitting CSI assigned by the base station to the user equipment), or the first PUCCH;

Step 303 will be implemented only if the UE determines the subframe for ACK/NACK feedback is also needed for periodical CSI feedback, or it can be conducted in other situations. The second PUCCH in step 303 is the second physical uplink control channel; the first PUCCH is the first physical uplink control channel; the explanation of the first PUCCH and the second PUCCH are the same in all of the embodiments of present invention. Also need to understand is that the implementation of step 303 is not limited to the situation when the UE determines to feed back both of CSI and ACK/NACK simultaneously, the technical solution for transmission provided in the embodiments of present invention can be used as long as in the situation when UE needs to transmit both CSI and ACK/NACK simultaneously.

The first part of information bits in ACK/NACK information bits mentioned above can be 1 bit or 2 bits in ACK/NACK information bits, but, the first part of information bits in ACK/NACK information bits should not be limited to present instances. In the embodiments of present invention, ACK/NACK information bits can be divided into two parts, i.e., the first part of information bits and the second part of information bits. When the first part of information bits is 1 bit or 2 bits, the remaining information bits of ACK/NACK information bits to be transmitted can be referred to as the second part of the information bits in ACK/NACK information bits to be transmitted.

Following description is for the purpose of understanding step 303.

PUCCH usually includes two time slots, each time slot includes data symbols (the SC-FDMA symbols for transmitting uplink control information) and pilot symbols (the SC-FDMA symbols for transmitting pilot). The PUCCH in the embodiments of present invention can be PUCCH Format 2 or DFT-S-OFDM. The PUCCH with different formats has different structures, take PUCCH Format 2 for example, the channel structures of each time slot is shown in FIG. 4, the second and the sixth symbols of each time slot carry pilot.

In step 303, the first part of information bits in ACK/NACK information bits can be mapped to the second pilot symbol of each PUCCH time slot for transmission, or it can be mapped to all pilot symbols or the first pilot symbol. There is no limitation to which pilot symbol should be mapped, but, mapping to the second pilot symbol of each time slot for transmission is preferable in present invention. Mapping to the second pilot symbol of each time slot can be compatible with LTE Rel8.

There is no limitation on which part of information bits in ACK/NACK information bits should be selected as the first part of information bits for mapping to the pilot symbol for transmission. Selecting ACK/NACK information bits corresponding to downlink primary carrier of user as the first part of information bits for mapping to the second pilot symbol of each PUCCH time slot for transmission is preferable in present invention, the ACK/NACK information bits corresponding to the downlink primary carrier can be 2 bits or 1 bit, it depends on the transmission mode for the primary carrier, for example, when the transmission mode for the primary carrier is closed-loop spatial multiplexing, two code words of downlink data are scheduled on the downlink primary carrier, each code word generates 1 bit ACK/NACK, so the ACK/NACK information corresponding to the downlink primary carrier is 2 bits.

In present invention, it can fixedly select 2 bits in ACK/NACK information bits to be transmitted as the first part of information bits for mapping to the second pilot symbol of each PUCCH time slot for transmission, this 2 bits ACK/NACK information can be the 2 bits in ACK/NACK information bits corresponding to the downlink primary carrier; if the ACK/NACK information bits corresponding to the downlink primary carrier is 1 bit, the other 1 bit ACK/NACK information can be 1 bit ACK/NACK information corresponding to the downlink carrier which is downlink non-primary carrier, the downlink carrier which is the downlink non-primary carrier can be the downlink component carrier which has the minimum index (or the next minimum index), here is an example to facilitate the understanding on the embodiments of present invention, it is not a limitation on the embodiments of present invention.

Because the probability of scheduling the primary carrier is high in the practical application, the performance of transmitting ACK/NACK on pilot symbol is better than the performance of mapping ACK/NACK to data symbol and jointly coding with CSI for transmission, so transmitting the ACK/NACK corresponding to the primary carrier on pilot further guarantees that the base station can obtain ACK/NACK corresponding to the downlink primary carrier accurately.

Mapping the selected ACK/NACK information bits to pilot symbol for transmission further includes:

Step 303a: the UE maps a first part of information bits in ACK/NACK information bits to a modulated symbol according to a predetermined constellation point mapping rule;

If the selected first part of ACK/NACK information bits is 2 bits, then performing Quadrature Phase Shift Keying (QPSK) modulation; if the selected ACK/NACK information bit is 1 bit, then performing Binary Phase Shift Keying (BPSK) modulation. If the selected first part of ACK/NACK information bits is greater than 2 bits, higher order of modulation can be used in this case, for example, performing 16QAM modulation for 4 bits. The constellation point mapping of QPSK modulation can follow the rule shown in Table 1, or the rule shown in Table 2. The constellation point mapping of BPSK modulation can follow the rule shown in Table 3.

TABLE 1

Mapping mode 1 for QPSK modulation

| b(i), b(i + 1) | modulated symbol |
|---|---|
| 00 | 1 |
| 01 | -j |
| 10 | j |
| 11 | -1 |

TABLE 2

Mapping mode 2 for QPSK modulation

| b(i), b(i + 1) | I | Q |
|---|---|---|
| 00 | 1/ | 1/ |
| 01 | 1/ | — |
| 10 | — | 1/ |
| 11 | — | — |

TABLE 3

Mapping mode for BPSK modulation
Modulated symbol

| |
|---|
| 1 |
| -1 |

The modulated symbol is I+jQ if following the rule shown in Table 2. When the modulation is QPSK, it is compatible with LTE Rel-8 if following the rule shown in Table 1, following the rule shown in Table 2 facilitates the base station to distinguish the transmission mode of transmitting CSI only and the transmission mode of transmitting both of CSI and ACK/NACK, thus it avoids the problem of Discontinuous Transmission (DTX) to ACK (specific reasons will be explained in step 305).

Step 303b: mapping the modulated symbol obtained in step 303a to pilot symbol on physical uplink control channel for transmission.

Assume the modulated symbol is d, the preset pilot sequence corresponding to pilot symbol is $r_{u,v}^{(\alpha)}(n)$, n=0, $M_{SC}^{RS}$, $M_{SC}^{RS}$ is the number of subcarrier occupied by pilot signal in frequency domain, multiplying obtained modulated symbol and pilot signal, then mapping to pilot symbol to get the pilot sequence as: $r^{PUCCH}(n) = d \cdot r_{u,v}^{(\alpha)}(n)$.

Step 304: jointly coding and mapping a second part of information bits in ACK/NACK information bits and the information selected in CSI to a data symbol of PUCCH for transmission, the PUCCH can be the first PUCCH or the second PUCCH;

Wherein, jointly coding and mapping a second part of information bits in ACK/NACK information bits and the information selected in CSI in step 304 further comprises:

Step 304a: ordering the remaining ACK/NACK information bits (i.e., the second part of information bits) and the information selected from CSI according to a preset ordering rule by UE;

Step 304b: performing channel coding for the ordered information bits by UE, for example, using convolutional code or Reed-Muller (RM) code for channel coding.

Wherein, the preset ordering rule mentioned in step 304a can be the rule that the information bits selected from CSI are ordered at the end of the remaining ACK/NACK information bits, or, it also can be the rule that the remaining ACK/NACK information bits are ordered at the end of the information bits selected from CSI. When the channel code is RM code, preferably, the remaining ACK/NACK information bits are ordered at the end of the information bits selected from CSI, this ordering rule increases the performance of effective information bits when there are too many redundant bits in ACK/NACK information bits, because the redundant bits in ACK/NACK information bits is 0 bit, ordering it after the effective bits will not influence the transmission performance of effective information bits according to the characteristic of RM code.

Step 305: determining channel state information to be detected by the base station; detailed explanation about step 305 can be referred to step A1.

Step 306: obtaining the determined channel state information to be detected and ACK/NACK on PUCCH by the base station further comprises: obtaining the first part of information bits in ACK/NACK information from the pilot symbol on PUCCH (the part usually indicate 1 bit or 2 bits), obtaining the determined channel state information to be detected and the second part of information bits in ACK/NACK information bits from the data symbol on PUCCH.

Wherein, in step 306, obtaining the first part of information bits in ACK/NACK from pilot symbol on PUCCH further comprises: here is an example, preferably, modulating 2 bits in ACK/NACK information bits to QPSK symbol and mapping to the second pilot symbol on each PUCCH time slot for transmission, then the base station uses channel estimated value of first pilot symbol on each PUCCH time slot as the channel value of the second pilot symbol and performs modulation on ACK/NACK, obtaining the first part of ACK/NACK information bits according to the 2 bits constellation point mapping rule after performing maximum ratio combining of the received signals from multiple antennas and two slots.

If there is no ACK/NACK information obtained from pilot symbol, the base station determines that UE transmits CSI only without ACK/NACK information, but in fact, the base station has sent downlink data, and determined that there should be ACK/NACK information transmitted on the received PUCCH at this moment, thus, the base station determines the UE didn't get any downlink data, that is to say the base station detected the DTX of hybrid automatic repeat request acknowledgement information is occurred. No ACK/NACK information is obtained from pilot symbol means the modulated symbol modulated from pilot symbol on PUCCH according to preset constellation point mapping rule by base station is not in the range of ACK/NACK modulated symbol's judgment, that is to say it fails to map the received modulated symbol to ACK/NACK information bits; or it means the modulated symbol modulated from pilot symbol on PUCCH by the base station is approximately equal to 1, that is to say there is no ACK/NACK modulated symbol from pilot symbol. For example, when UE performs QPSK modulation according to QPSK constellation point mapping mode 2, the base station determines whether only CSI is transmitted or both of CSI and ACK/NACK are transmitted according to the modulated symbol demodulated from pilot symbol on PUCCH. When only CSI is transmitted, the pilot symbol will not carry modulated symbol for ACK/NACK information, so that the modulated symbol obtained before the determination using constellation point mapping rule is approximately equal to 1. So, when the modulated symbol of ACK/NACK demodulated from pilot symbol by the base station is approximately equal to 1, the base station determines only CSI is transmitted on PUCCH by user, so that it read CSI only when reading the information bits obtained from channel decoding, avoids the problem of DTX to ACK caused by interpreting parts of CSI as ACK/NACK information.

Note that, when the first part of information bits in ACK/NACK information bits is mapped to modulated symbol according to constellation point mapping rule shown in Table 1, base station obtains ACK/NACK information from pilot symbol, and this also solves the problem of DTX to ACK, limits the probability of DTX to ACK within certain target value, such as 0.01. For example, when the ACK/NACK DTX occurred and only the channel state information is transmitted by the user equipment, the base station can read NACK information from pilot symbol, but in this case, when base station performing channel decoding on the data transmitted on a data symbol of the physical uplink control channel, the probability of interpreting parts of information corresponding to ACK/NACK into NACK is high, this makes the probability of ACK/NACK DTX to ACK low, lower than certain target value, and solves the problem of DTX to ACK.

Wherein, to facilitate the understanding, the scenario for the problem of DTX to ACK can be: the base station scheduled downlink data, but the user equipment didn't detect the scheduled downlink data because the user equipment lost PDCCH corresponding to the downlink data, so that there is no ACK/NACK information for feedback, however, the base station needs to detect whether there is DTX, because the base station scheduled downlink data and supposed to receive ACK/NACK from the user feedback.

Note that, in step 306, obtaining determined channel state information to be detected from data symbol on PUCCH and the second part of information bits in ACK/NACK information bits further comprises: performing channel decoding on the data transmitted on a data symbol on PUCCH, and reading CSI and ACK/NACK after channel decoding according to preset ordering rule. The present ordering rule can be the rule that the determined channel state information to be detected is ordered at the end of the second part of information bits in ACK/NACK information bits, or the rule that the second part of information bits in ACK/NACK information bits is ordered at the end of the determined channel state information to be detected.

The method provided in the embodiments of present invention realizes multiplexing of channel state information CSI and hybrid automatic repeat request acknowledgement information ACK/NACK, selecting information from CSI according to the performance of PUCCH and multiplexing with ACK/ANCK avoids the problem of system downlink throughput decrease caused by dropping all CSI, and avoids the problem that system downlink throughput is influenced by unnecessary data retransmission on a downlink carrier caused by ACK/NACK bundling among carriers, no ACK/NACK bundling among carriers and transmitting the most important information in channel state information together with ACK/NACK not only guarantees the performance of ACK/NACK, but also acquires some channel quality information, reduces the influence on system throughput and avoids to increase extra resource overhead.

Further, in the embodiments of present invention, mapping part information in ACK/NACK information to be transmitted to pilot symbol for transmission, when QPSK modulation shown in Table 2 has been used, it enables the base station to distinguish those two transmission modes: transmitting CSI only or simultaneously transmitting both of the information selected in CSI and ACK/NACK, avoids the problem of ACK/NACK DTX to ACK.

Modulating and mapping part information in ACK/NACK information to be transmitted on pilot symbol for transmission according to the constellation point mapping mode shown in Table 1 and Table 2 enables the base station to determine whether only CSI is transmitted or both of CSI and ACK/NACK are transmitted, and avoids the problem of ACK/NACK DTX to ACK. This technical solution is not only limited to the solution of multiplexing of CSI and ACK/NACK provided in the embodiments of present invention, but also can be used in other solutions involving transmitting CSI and ACK/NACK simultaneously. Thus, it can be used to solve the problems of determining whether only CSI is transmitted or both of CSI and ACK/NACK are transmitted.

The method provided in the embodiments of present invention can be used in LTE-A FDD and LTE-A TDD system.

FIG. 5 is a flowchart of another method for transmitting information on physical uplink control channel according to an embodiment of the present invention, this method will focus on simultaneously transmitting ACK/NACK and the information selected from CSI (or referred to as CQI by those skilled in the art), the method comprises:

Step 501 and step 502 are respectively similar with step 301 and step 302 in FIG. 3, in later explanation, it can be learned that the methods in FIG. 3 and FIG. 5 are different.

Note that, selecting information from the channel state information in step 502 can be based on the preset rule described in step S1 rather than the high layer parameters (detailed information can be referred to step S1), in this case, the step 501 can be omitted.

Step 503: when both of the ACK/NACK and periodical CSI are needed for feedback, jointly coding and mapping the information selected from CSI in step 502 and ACK/NACK information bits to data symbol on PUCCH for transmission, preferably, the PUCCH is the second PUCCH;

Wherein, the joint coding method shown in step 503 is similar with the joint coding method in step 304 shown in FIG. 3, so the detailed description is omitted herein.

Step 504, UE modulates a pilot symbol on physical uplink control channel by using orthogonal spreading code; wherein, the orthogonal spreading code utilized when only channel state information is carried on the data symbol of physical uplink control channel is different from the orthogonal spreading code utilized when both of the information selected from channel state information and the hybrid automatic repeat request acknowledgement information are carried on the data symbol of physical uplink control channel;

Preferably, when only CSI is carried on data symbol of PUCCH, the orthogonal spreading code to be utilized is [1,1]; when both of the information selected from CSI and the ACK/NACK are carried on data symbol of PUCCH simultaneously, the orthogonal spreading code to be utilized is [1,-1]. Here is only an example of utilized orthogonal spreading code, it should not be interpreted as a limitation on the embodiments of present invention.

Note that step 504 can be implemented before step 503.

Step 505: the base station determines the channel state information to be detected; more detailed explanation for step 505 can be referred to step A1;

Step 506: the base station obtains the determined channel state information to be detected and ACK/NACK on PUCCH further comprises: performing channel decoding on the data transmitted on a data symbol of the second PUCCH, reading the determined channel state information to be detected and ACK/NACK information according to a preset ordering rule.

Wherein, the preset ordering rule mentioned in step 506 can be the rule that the CSI information bits are ordered at the end of ACK/NACK information bits, or, ACK/NACK information bits are ordered at the end of CSI information bits.

Preferably, Step 506: the base station obtains ACK/NACK on PUCCH and determines the channel state information to be detected further comprises: utilizing different orthogonal spreading code to perform time domain dispreading on a pilot symbol of the second PUCCH respectively, comparing two energy obtained from time domain dispreading; determining the orthogonal spreading code used by the user according to the result of comparison of those two energy. Base on the orthogonal spreading code used by the user, determining whether only CSI or both of the CSI and ACK/NACK are simultaneously transmitted on PUCCH. When it is determined that the CSI and ACK/NACK are simultaneously transmitted, performing channel decoding on the data transmitted on the data symbol of PUCCH, and reading the CSI and ACK/NACK according to a preset ordering rule. When it is determined that only CSI is transmitted on PUCCH, and when the base station determines that the ACK/NACK needs to be transmitted on PUCCH according to the scheduling state of user, the base station determines that the DTX of ACK/NACK is occurred (that is to say UE didn't receive downlink data sent by the base station), it avoids the problem of ACK/NACK DTX to ACK.

Here is an explanation to facilitate the understanding of step 506, comprises: the base station determines whether both of CSI and ACK/NACK are simultaneously transmitted according to the scheduling state of data, if the base station scheduled downlink data on corresponding subframe, it can be estimated that the CSI and ACK/NACK are simultaneously transmitted, if the base station didn't schedule downlink data on corresponding subframe, it can be estimated that only CSI is transmitted. If the base station estimates that CSI and ACK/NACK are transmitted simultaneously, performing frequency domain dispreading on two pilot symbols first, and then performing time domain orthogonal dispreading on pilot symbols respectively by utilizing the orthogonal spreading code of [1,−1] and [1,1], and then comparing the energies obtained from time domain dispreading utilizing two orthogonal spreading codes, determining that the user uses the orthogonal spreading code corresponding to higher energy. If it is determined that the orthogonal spreading code used by the user is [1,1], then it is determined that the situation of ACK/NACK DTX to ACK is occurred to the user, only CSI is transmitted on the received PUCCH, so that reading CSI only when reading the information transmitted on data symbol of PUCCH, it avoids the problem of DTX to ACK. If it is determined that the orthogonal spreading code used by the user is [1,−1], then it is determined that both of the CSI and ACK/NACK are transmitted on data symbol of PUCCH simultaneously, reading the determined channel state information to be detected and ACK/NACK information according to preset ordering rule.

The method provided in the embodiments of present invention shown in FIG. 5 realizes multiplexing of channel state information CSI and hybrid automatic repeat request acknowledgement information, selecting information from CSI based on the performance of PUCCH and multiplexing with ACK/NACK avoids the problem of system downlink throughput decrease caused by dropping all CSI, and avoids the problem the system downlink throughput is influenced by unnecessary data retransmission on a downlink carrier caused by ACK/NACK bundling among carriers, no ACK/NACK bundling among carriers and transmitting the most important information in channel state information together with ACK/NACK not only guarantees the performance of ACK/NACK, but also acquires some channel quality information, reduces the influence on system throughput and avoids to increase extra resource overhead.

Further, in the embodiments of present invention, performing orthogonal spreading on pilot symbol in each time slot by utilizing orthogonal spreading code enables the base station to determine whether only CSI is transmitted or both of the CSI and ACK/NACK are simultaneously transmitted on received PUCCH according to determined orthogonal code used by the user, so that it avoids the problem of ACK/NACK DTX to ACK.

The method provided in the embodiments of present invention can be used in LTE-A FDD and LTE-A TDD system.

Figure 6:
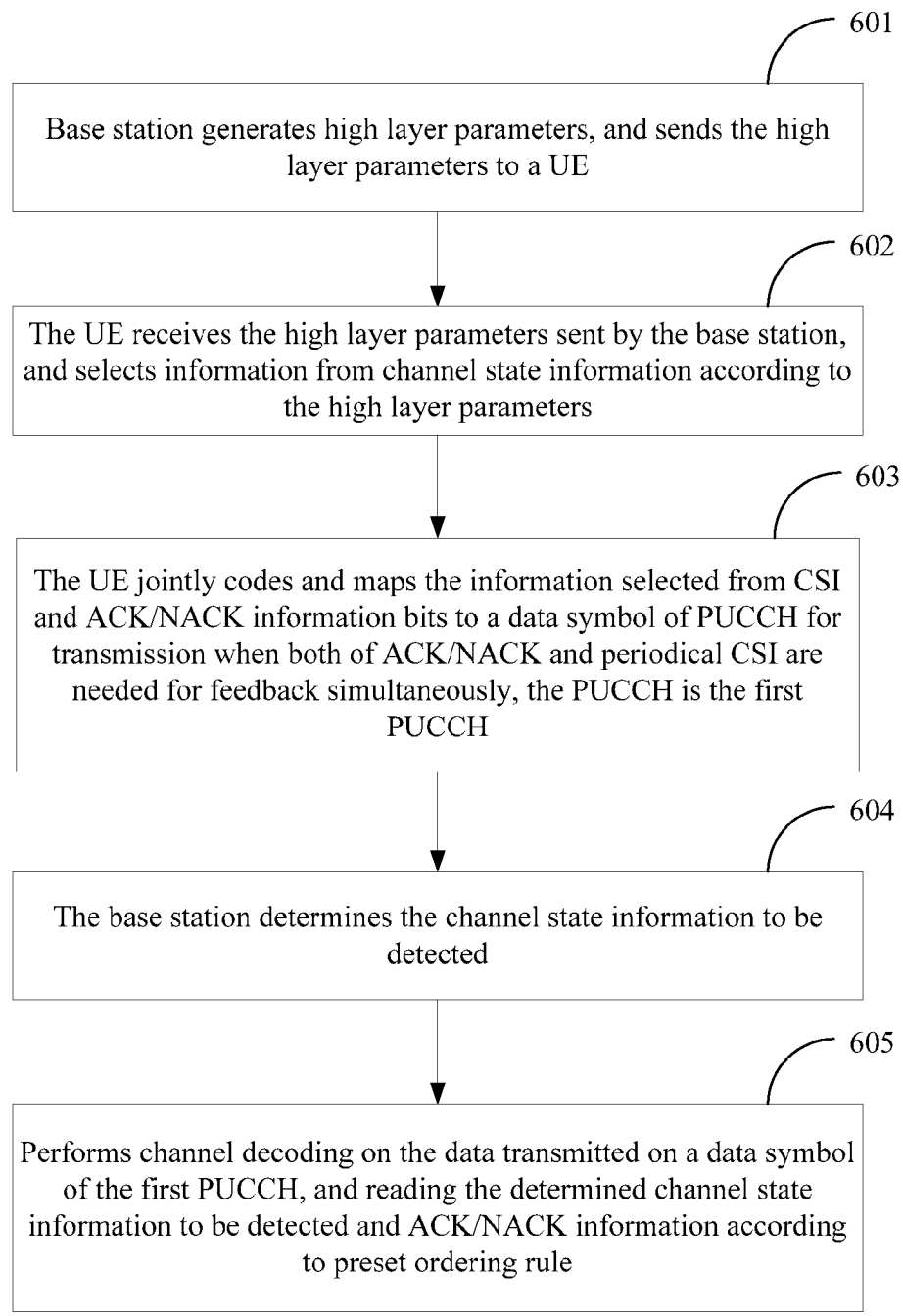
FIG. 6 is a flowchart of a method for transmitting information on physical uplink control channel according to another embodiment of the present invention.

FIG. 6 is a flowchart of another method for transmitting information on physical uplink control channel according to the embodiment of the present invention, this method also focus on simultaneously transmitting ACK/NACK and the information selected in CSI (or referred to as CQI by those skilled in the art), the method is similar with the method shown in FIG. 5, it differs in the technical solution of how to solve the problem of ACK/NACK DTX to ACK. More detailed explanation for the method shown in FIG. 6 is as follows:

Step 601 and step 602 are respectively similar with step 301 and step 302 shown in FIG. 3.

Note that, selecting information from the channel state information in step 602 can be based on the preset rule described in step S1 rather that the high layer parameters (detailed information can be referred to step S1), in this case, step 601 can be omitted.

Step 603: when both of ACK/NACK and periodical CSI are needed for feedback, jointly coding and mapping the information selected from CSI in step 602 and ACK/NACK information bits to data symbol on PUCCH for transmission, the PUCCH is the first PUCCH;

Wherein, the joint coding method in step 603 is similar with the joint coding method shown in FIG. 3, so the detailed description is omitted herein.

Note that, if there is no ACK/NACK when UE periodically feeds back CSI, transmitting CSI on the second PUCCH.

Step 604: the base station determines the channel state information to be detected; more detailed explanation about step 604 can be referred to step A1;

Step 605: obtaining ACK/NACK and determined channel state information to be detected on PUCCH by the base station further comprises: performing channel decoding on the date transmitted on a data symbol of the first PUCCH, and reading the determined channel state information to be detected and ACK/NACK information according to a preset ordering rule;

Preferably, the method further comprises:

Step: 605: if the base station is unable to read CSI and ACK/NACK information on first PUCCH, or, it is determined that there is no signal on first PUCCH, then read CSI on the second PUCCH. Preferably, if the base station determines both of the information in CSI and ACK/NACK are transmitted simultaneously, and, the base station is unable to read both of CSI and ACK/NACK information on first PUCCH, or, it is determined that there is no signal on first PUCCH, then the base station determines the ACK/NACK DTX is occurred.

Unable to read CSI and ACK/NACK information on first PUCCH can be interpreted as detecting the energy of pilot symbol of first PUCCH, if the energy is lower than certain threshold, it is determined that there is no signal transmitted on the PUCCH, so that it is unable to read CSI and ACK/NACK information.

The method provided in the embodiments of present invention shown in FIG. 6 realizes a multiplexing of channel state information CSI and hybrid automatic repeat request acknowledgement information, selecting information from CSI based on the performance of PUCCH and multiplexing with ACK/NACK avoids the problem of system downlink throughput decrease caused by dropping all CSI, and avoids the problem the system downlink throughput is influenced by unnecessary data retransmission on a downlink carrier caused by ACK/NACK bundling among carriers, no ACK/NACK bundling among carriers and transmitting the most important information in the channel state information together with ACK/NACK not only guarantees the performance of ACK/NACK, but also acquires some channel quality information, reduces the influence on system throughput and avoids to increase extra resource overhead.

Further, in the embodiments of present invention, transmitting on the channel for CSI transmission when only CSI is transmitted, and transmitting on the first physical uplink control channel when both of the CSI and ACK/NACK are transmitted enables the base station to determine whether only CSI is transmitted or both of CSI and ACK/NACK are transmitted, so that avoids the problem of ACK/NACK DTX to ACK.

The method for transmitting on a channel for ACK/NACK transmission when CSI and ACK/NACK are multiplexed provided in present invention enables the base station to determine whether only CSI is transmitted or both of CSI and ACK/NACK are simultaneously transmitted, and avoids the problem of ACK/NACK DTX to ACK. This method is not only limited to the solution in the present invention, it can also be used in other solutions involving transmitting CSI and ACK/NACK simultaneously. It can be used in the telecommunication system to solve the problem of determining whether only CSI is transmitted or both of CSI and ACK/NACK are transmitted.

The method provided in the embodiments of present invention can be used in LTE-A FDD and LTE-A TDD system.

Figure 7:
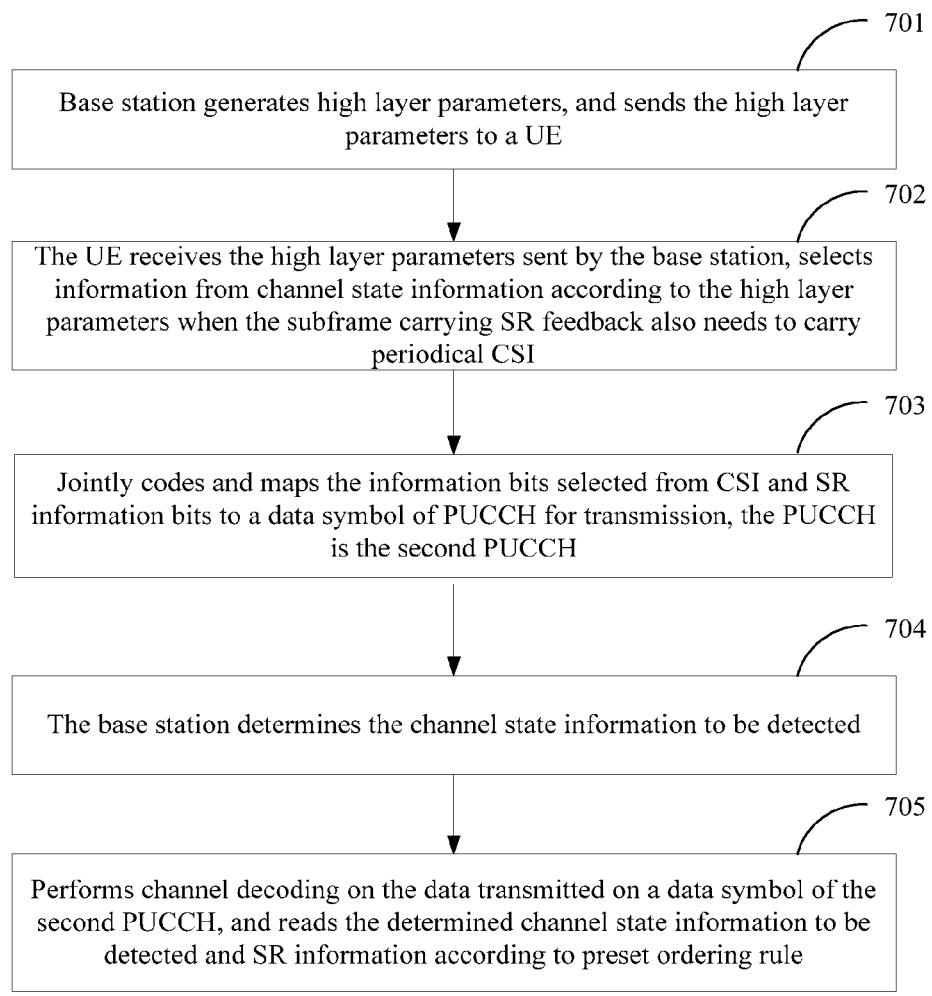
FIG. 7 is a flowchart of a method for transmitting information on physical uplink control channel according to another embodiment of the present invention.

FIG. 7 is a flowchart of another method for transmitting information on physical uplink control channel according to the embodiment of the present invention, this method focus on simultaneously transmitting SR and the information selected in CSI (or referred to as CQI by those skilled in the art). More detailed explanation for the method shown in FIG. 7 comprises:

Step 701: a base station generates high layer parameters, and sent the high layer parameters to a UE; this step is the same as step A3 shown in FIG. 2, detailed explanation can be referred to step A3, so the detailed description is omitted herein.

Step 702: the UE receives the high layer parameters sent by the base station, when the subframe carrying SR feedback also needs to carry the feedback of periodical CSI, selecting information in the channel state information according to the high layer parameters; this step is the same as step S1 shown in FIG. 1, detailed explanation can be referred to step S1, so the detailed description is omitted herein.

Note that, selecting information from the channel state information in step 702 can be based on the preset rule described in step S1 rather than the high layer parameters (detailed information can be referred to step S1), in this case, step 701 can be omitted.

Step 703: when both of SR and periodical CSI are needed for feedback, the UE simultaneously transmits both of SR and the information selected in CSI in step 702; further comprises: jointly coding and mapping the information bits selected in CSI and SR information bits to data symbol of PUCCH for transmission, the PUCCH is the second PUCCH.

Also need to understand is that the implementation of step 703 is not only limited to the situation when UE determines to feed back both of CSI and SR at the same time, the technical solution for transmission provided in the embodiments of present invention can be used as long as in the situation when UE needs to transmit both CSI and ACK/NACK simultaneously.

Here is the explanation to facilitate the understanding of step 506, comprises: in the LTE-A system, mapping SR to information bits for transmission, for example, using 1 to indicate positive scheduling request and 0 to indicate negative scheduling request when using 1 bit to indicate SR. Or using 00 to indicate negative scheduling request and 11 to indicate positive scheduling request when using 2 bits to indicate SR. Wherein, joint coding CSI information bits mentioned above and SR information bits to be transmitted further comprises:

Step 703a: the UE orders SR information bits and the information bits selected in CSI according to preset ordering rule;

Wherein, the ordering rule in step 703a can be the rule that the information bits selected from CSI are ordered at the end of SR information bits, or it can be the rule that the SR information bits are ordered at the end of the information bits selected from CSI.

Step 703b: performing channel coding on the ordered information bits, such as using RM code or convolutional code for channel coding.

Step 704: the base station determines the channel state information to be detected; detailed explanation about step 704 can be referred to step A1;

Step 705: the base station obtains SR and the determined channel state information to be detected on PUCCH further comprises: performing channel decoding on the data transmitted on a data symbol of second PUCCH, and reading the determined channel state information to be detected and SR information according to preset ordering rule;

The method provided in the embodiment of present invention shown in FIG. 7 realizes a multiplexing of channel state information CSI and hybrid automatic repeat request acknowledgement information, selecting information from CSI based on the performance of PUCCH and multiplexing with SR avoids the problem of system downlink throughput decrease caused by dropping all CSI, it not only guarantees the performance of SR, but also acquires some channel quality information, reduces the influence on system throughput and avoids to increase extra resource overhead.

The methods shown in above FIG. 3, FIG. 5, FIG. 6, FIG. 7 are the method for transmitting both of CSI and ACK/NACK or the method for transmitting both of CSI and SR on PUCCH, the below technical content is about transmitting all of CSI, ACK/NACK and SR together on PUCCH. Wherein, the method for transmitting all of CSI, ACK/NACK and SR together on PUCCH is based on above FIG. 3, FIG. 5, FIG. 6 and FIG. 7. Here will give four examples of method for transmitting CSI, ACK/NACK and SR together on physical uplink control channel.

Method 1: a method for transmitting information on physical uplink control channel, the method comprises:

Step C1: a base state generates high layer parameters, and sends the high layer parameters to a UE; this step is similar with step A3 shown in FIG. 2, more detailed explanation can be referred to step A3, so the detailed description is omitted herein.

Step C2: the UE receives the high layer parameters sent by the base station, when all of the ACK/NACK, the information selected in CSI and SR are needed for feedback, selecting information in the channel state information according to the high layer parameters; this step is the same with step S1 shown in FIG. 1, more detailed explanation can be referred to step S1, so the detailed description is omitted herein.

Note that, selecting information from the channel state information in step C2 can be based on the preset rule described in step S1 rather than the high layer parameters (detailed information can be referred to step S1), in this case, step C1 can be omitted.

Step C3: when all of ACK/NACK, the information from CSI and SR are needed for feedback, transmitting all of the ACK/NACK, SR and the information selected in CSI in step C2 on PUCCH further comprises: jointly coding and mapping the information bits selected in CSI and ACK/NACK information bits to a data symbol on PUCCH for transmission; mapping SR information bits to a pilot symbol of PUCCH for transmission; the PUCCH is the first PUCCH;

Wherein, detailed information about jointly coding and mapping information bits selected in CSI and ACK/NACK information bits to a data symbol of PUCCH for transmission can be referred to step 503 shown in FIG. 5; detailed information about mapping SR information bits to a pilot symbol of PUCCH for transmission can be referred to step 303 shown in FIG. 3, replacing ACK/NACK information bits in step 303 with SR information bits;

Step C4: the base station determines the channel state information to be detected; more detailed explanation about step C4 can be referred to step A1.

Step C5: the base station obtains all of ACK/NACK, SR and the determined channel state information to be detected on the first PUCCH further comprises: obtaining SR on a pilot symbol of first PUCCH, and obtaining ACK/NACK and the determined channel state information to be detected on a data symbol of this PUCCH, more detailed explanation can be referred to step 305 shown in FIG. 3 for facilitating understanding.

Method 2: a method for transmitting information on physical uplink control channel, the method comprises:

Step D1: a base state generates high layer parameters, and sends the high layer parameters to a UE; this step is similar with step A3 shown in FIG. 2, more detailed explanation can be referred to step A3, so the detailed description is omitted herein.

Step D2: the UE receives the high layer parameters sent by the base station, when all of the ACK/NACK, the information selected in CSI and SR are needed for feedback, selecting information in the channel state information according to high layer parameters; this step is the same with step S1 shown in FIG. 1, more detailed explanation can be referred to step S1, so the detailed description is omitted herein.

Note that, selecting information from the channel state information in step D2 can be based on the preset rule described in step S1 rather than the high layer parameters (detailed information can be referred to step S1), in this case, step D1 can be omitted.

Step D3: when all of ACK/NACK, the information from CSI and SR are needed for feedback, transmitting all of ACK/NACK, SR and the information selected in CSI on PUCCH in step D2 further comprises: jointly coding and mapping all of the information bits selected in CSI, ACK/NACK information bits and SR information bits to a data symbol on PUCCH for transmission; the orthogonal spreading code [1,−1] is multiplied by two pilot symbols of each PUCCH time slot, the PUCCH is the second PUCCH;

Wherein, the jointly coding mentioned in step D3 further comprises:

Step D3a: ordering ACK/NACK information bits, the information selected in CSI and SR information bits according to a preset ordering rule;

Step D3b: performing channel coding on the ordered information bits, such as using convolutional code or RM code for channel coding.

Wherein, the preset ordering rule in step D3a can be the rule that orders SR information bits first, then orders ACK/NACK information bits, and finally orders the information selected in CSI; or it can be the rule that orders SR information bits first, then orders the information selected in CSI, and finally orders the ACK/NACK information bits.

Step D4: the base station determines the channel state information to be detected; more detailed explanation about step D4 can be referred to step A1.

Step D5: the base station obtains all of ACK/NACK, SR and the determined channel state information to be detected on PUCCH further comprises: performing channel decoding on the data transmitted on a data symbol of the second PUCCH, and reading the determined channel state information to be detected, ACK/NACK and SR information according to the preset ordering rule. More detailed explanation can be referred to step 505 shown in FIG. 5 for facilitating understanding.

Method 3: a method for transmitting information on physical uplink control channel, the method comprises:

Step E1: a base state generates high layer parameters, and sends the high layer parameters to a UE; this step is similar with step A3 shown in FIG. 2, more detailed explanation can be referred to step A3, so the detailed description is omitted herein.

Step E2: the UE receives the high layer parameters sent by the base station, when all of the ACK/NACK, the information selected in CSI and SR are needed for feedback, selecting information in the channel state information according to the high layer parameters; this step is the same as step S1 shown in FIG. 1, more detailed explanation can be referred to step S1, so the detailed description is omitted herein.

Note that, selecting information from the channel state information in step E2 can be based on the preset rule described in step S1 rather than the high layer parameters (detailed information can be referred to step S1), in this case, step E1 can be omitted.

Step E3: when all of ACK/NACK, the information from CSI and SR are needed for feedback, transmitting all of ACK/NACK, SR and the information selected in CSI in step E2 on PUCCH further comprises: mapping a part of information bits in ACK/NACK information bits to a pilot symbol of PUCCH for transmission, wherein, the PUCCH is the first PUCCH or the second PUCCH; jointly coding and mapping the remaining ACK/NACK information bits, the information selected in CSI in step E2 and SR information bits to a data symbol of PUCCH for transmission.

Step E4: the base station determines the channel state information to be detected; more detailed explanation about step D4 can be referred to step A1.

Step E5: the base station obtains all of ACK/NACK, SR and the determined channel state information to be detected on PUCCH further comprises: obtaining the first part of information bits in ACK/NACK information bits on a pilot symbol of PUCCH; obtaining the determined channel state information to be detected, the second part of information bits in ACK/NACK information bits and SR on a data symbol of PUCCH, and reading the determined channel state information to be detected, the remaining ACK/NACK and SR according to the preset ordering rule. More detailed explanation can be referred to step 505 shown in FIG. 5 for facilitating understanding.

Method 4: a method for transmitting information on physical uplink control channel, the method comprises:

Step F1: a base state generates high layer parameters, and sends the high layer parameters to a UE; this step is similar with step A3 shown in FIG. 2, more detailed explanation can be referred to step A3, so the detailed description is omitted herein.

Step F2: the UE receives the high layer parameters sent by the base station, when all of the ACK/NACK, the information selected in CSI and SR are needed for feedback, selecting information in the channel state information according to the high layer parameters; this step is the same with step S1 shown in FIG. 1, more detailed explanation can be referred to step S1, so the detailed description is omitted herein.

Note that, selecting information from the channel state information in step F2 can be based on the preset rule described in step S1 rather than the high layer parameters (detailed information can be referred to step S1), in this case, step F1 can be omitted.

Step F3: when all of ACK/NACK, the information from CSI and SR are needed for feedback, transmitting all of ACK/NACK, SR and the information selected in CSI in step F2 on PUCCH further comprises: jointly coding and mapping both of the information bits selected in CSI and SR information bits to a data symbol of PUCCH; mapping ACK/NACK information bits to a pilot symbol of PUCCH for transmission; the PUCCH is the second PUCCH.

Wherein, mapping ACK/NACK information bits to a pilot symbol of PUCCH for transmission can be referred to step 303, in this case, constellation point mapping rule is selected according to the total number of bits for ACK/NACK, it can use higher order of modulation such as 16QAM; or bundling ACK/NACK information bits into 2 bits and mapping to a pilot symbol for transmission according to step 303, the details about how to bundle ACK/NACK information bits into 2 bits can be referred to prior art 2.

Step F4: the base station determines the channel state information to be detected; more detailed explanation about step F4 can be referred to step A1.

Step F5: the base station obtains all of ACK/ANCK, SR and the determined channel state information to be detected on PUCCH further comprises: obtaining ACK/ANCK on a pilot symbol of the second PUCCH (detailed explanation can be referred to step 305 shown in FIG. 3), obtaining the determined channel state information to be detected and SR on a data symbol of the second PUCCH (detailed explanation can be referred to step 704 shown in FIG. 7).

These four methods provided in the embodiments of present invention realizes multiplexing of channel state information CSI, hybrid automatic repeat request acknowledgement information ACK/ANCK and SR, selecting information from CSI according to the performance of PUCCH and multiplexing with ACK/ANCK and SR avoids the problem of system downlink throughput decrease caused by dropping all CSI, it not only guarantees the performance of ACK/ANCK and SR, but also acquires some channel quality information, reduces the influence on system throughput and avoids to increase extra resource overhead;

The method for multiplexing of CSI and ACK/ANCK and/or SR provided in the embodiments of present invention can also be used in following scenario: when the number of downlink aggregated carriers is above or equal to 3 and the channel state information feedback periodicity of one or multiple downlink carriers is 2 ms, it is impossible to report the information selected in CSI for multiple downlink carriers in terms of TDM without any collision, it comes the circumstance that one subframe has to report two or three channel state information of downlink carriers, the total number of information bits to be feed back by the subframe used for reporting channel state information of two or three downlink carriers increases substantially. When the subframe for reporting the channel state information of two or even three downlink carriers also needs to feed back ACK/ANCK and/or SR, the method provided in present invention can be used to select the most important information from CSI for multiple downlink carriers and transmit together with ACK/ANCK and/or SR. The most important information of CSI includes: one or more of wideband CQI, PMI, subband CQI and subband label.

Figure 8:
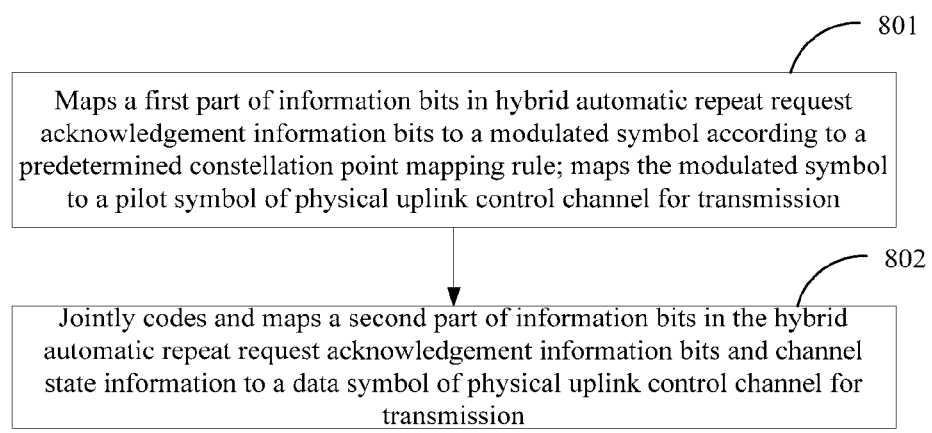
FIG. 8 is a flowchart of a method for transmitting information on physical uplink control channel according to another embodiment of the present invention.

Another method for transmitting information on physical uplink control channel is provided in the embodiments of present invention, as shown in FIG. 8, the method comprises:

Step 801: mapping a first part of information bits in hybrid automatic repeat request acknowledgement information bits to a modulated symbol according to a predetermined constellation point mapping rule; mapping the modulated symbol to a pilot symbol of physical uplink control channel for transmission.

Step 802: jointly coding and mapping a second part of information bits in the hybrid automatic repeat request acknowledgement information bits and channel state information to a data symbol of physical uplink control channel for transmission.

Detailed explanation about step 801 and step 802 can be referred to step 303 and step 304 shown in FIG. 3, the difference is that it may not select the information in the channel state information in the method shown in FIG. 8, the detailed description is omitted herein.

Figure 9:
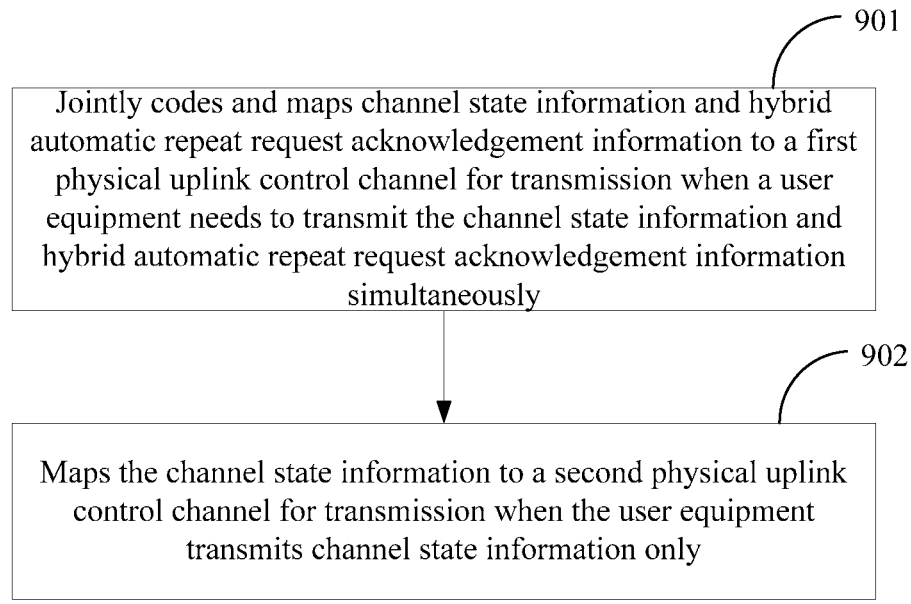
FIG. 9 is a flowchart of a method for transmitting information on physical uplink control channel according to another embodiment of the present invention.

Here is another method for transmitting information on physical uplink control channel provided in the embodiments of present invention, as FIG. 9 shown, the method comprises:

Step 901: when an user equipment needs to transmit channel state information and hybrid automatic repeat request acknowledgement information simultaneously, jointly coding and mapping the channel state information and hybrid automatic repeat request acknowledgement information to a first physical uplink control channel for transmission;

Step 902: when the user equipment transmits the channel state information only, mapping the channel state information to a second physical uplink control channel for transmission; wherein, the first physical uplink control channel is the physical uplink control channel allocated to the user equipment by a base station or network for transmitting hybrid automatic repeat request acknowledgement information, and the second physical uplink control channel is the physical uplink control channel allocated to the user equipment by the base station or network for transmitting the channel state information.

Detailed explanation about step 901 can be referred to step 603 shown in FIG. 6, the difference is that it may not select the information in the channel state information in the method shown in FIG. 9, the detailed description is omitted herein.

Another method for obtaining information transmitted on physical uplink control channel is provided in the embodiments of present invention, the method comprises:

Step G1: obtaining a first part of information bits in hybrid automatic repeat request acknowledgement information bits on a pilot symbol of physical uplink control channel;

Step G2: obtaining channel state information and a second part of information bits in hybrid automatic repeat request acknowledgement information bits on a data symbol of physical uplink control channel;

Detailed explanation about step G1 and step G2 can be referred to step 306 shown in FIG. 3, the difference is that the base station may not determine the channel state information to be detected, the detailed description is omitted herein.

Another method for obtaining information transmitted on physical uplink control channel is provided in the embodiments of present invention, the method comprises:

Step H1: determining whether both of channel state information and hybrid automatic repeat request acknowledgement information are simultaneously transmitted by user equipment; if so, proceeds to step H2, if not, proceeds to step H3;

Step H2: if so, obtaining the channel state information and hybrid automatic repeat request acknowledgement information on the first physical uplink control channel;

Step H3: if not, obtaining the channel state information on the second physical uplink control channel;

Wherein, the first physical uplink control channel is the physical uplink control channel allocated to the user equipment by a base station or network for transmitting hybrid automatic repeat request acknowledgement information, and the second physical uplink control channel is the physical uplink control channel allocated to the user equipment by the base station or network for transmitting the channel state information.

Detailed explanation about step H1 and step H2 can be referred to step 605 shown in FIG. 6, the difference is that the base station may not determine the channel state information to be detected, the detailed description is omitted herein.

Figure 10:
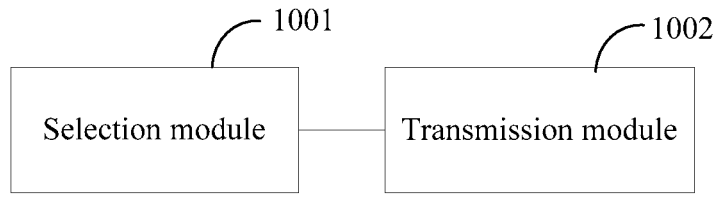
FIG. 10 is a schematic diagram of an apparatus for transmitting information on physical uplink control channel according to an embodiment of the present invention.

Here is an apparatus for transmitting information on physical uplink control channel shown in FIG. 10, the apparatus comprises: a selection module 1001 and a transmission module 1002, wherein, The selection module is configured for selecting information from channel state information, wherein selecting information from channel state information further comprises:

selecting wideband channel quality indicator and precoding matrix indicator from the channel state information, or selecting wideband channel quality indicator from the channel state information, or selecting precoding matrix indicator from the channel state information, or selecting subband channel quality indicator and subband position indicator from the channel state information, or selecting subband channel quality indicator, subband position indicator, and precoding matrix indicator from the channel state information; and The precoding matrix indication can be wideband precoding matrix indication, or long-term precoding matrix indication, or subband precoding matrix indication, or short-term precoding matrix indication, or wideband precoding matrix indication and subband precoding matrix indication, or long-term precoding matrix indication and short-term precoding matrix indication.

The transmission module is configured for transmitting the information selected from the channel state information on physical uplink control channel together with one or both of hybrid automatic repeat request acknowledgement information and/or scheduling request.

The apparatus for transmitting information on physical uplink control channel is provided in the embodiments of present invention, when this apparatus (specifically can be UE) needs to feed back ACK/NACK or SR, and in this case a UE needs to send CSI to a base station according to configured CSI feedback periodicity, that is to say when both of CSI and ACK/NACK or both of CSI and SR are simultaneously transmitted on PUCCH, transmitting ACK/NACK and/or SR together with the information selected in CSI on PUCCH, it avoids the problem of system downlink throughput decrease caused by dropping all CSI, and avoids the problem that system downlink throughput is influenced by unnecessary data retransmission on a downlink carrier caused by ACK/NACK bundling among carriers, simultaneously transmitting the information selected from CSI together with ACK/NACK or SR not only guarantees the performance of ACK/NACK or SR, but also obtains some channel quality information, reduces the influence on system throughput, and avoids additional resources overhead.

Preferably, selection module 1001 is further configured for selecting information from the channel state information according to the received high layer parameters sent from the base station or according to a preset rule.

Preferably, the transmission module is further configured for mapping a first part of information bits in hybrid automatic repeat request acknowledgement information bits to a pilot symbol of physical uplink control channel for transmission, jointly coding and mapping a second part of information bits in the hybrid automatic repeat request acknowledgement information bits and the information selected from the channel sate information to a data symbol of physical uplink control channel for transmission;

Or, the transmission module 1002 is further configured for jointly coding and mapping information bits selected from the channel state information and hybrid automatic repeat request acknowledgement information bits to a data symbol of physical uplink control channel for transmission; utilizing an orthogonal spreading code to modulate a pilot symbol of physical uplink control channel; wherein the orthogonal spreading code utilized when only channel state information is carried on the data symbol of physical uplink control channel is different from the orthogonal spreading code utilized when both of the information selected from the channel state information and the hybrid automatic repeat request acknowledgement information are carried on the data symbol of physical uplink control channel; the physical uplink control channel is the physical uplink control channel for transmitting channel quality indication;

Or, the transmission module 1002 is further configured for jointly coding and mapping information bits selected from the channel state information and hybrid automatic repeat request acknowledgement information bits to a data symbol of physical uplink control channel for transmission, the physical uplink control channel is the physical uplink control channel for transmitting hybrid automatic repeat request acknowledgement information;

Or, the transmission module 1002 is further configured for jointly coding and mapping information bits selected from the channel state information and scheduling request information bits to a data symbol of physical uplink control channel for transmission, the physical uplink control channel is the physical uplink control channel for transmitting channel quality indication.

Figure 11:
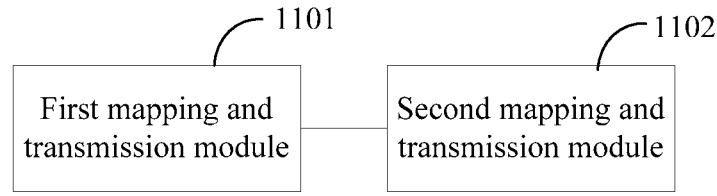
FIG. 11 is a schematic diagram of an apparatus for transmitting information on physical uplink control channel according to another embodiment of the present invention.

Another apparatus for transmitting information on physical uplink control channel is provided in the embodiments of present invention, shown in FIG. 11, the apparatus comprises: a first mapping and transmission module 1101 and a second mapping and transmission module 1102; wherein, The first mapping and transmission module is configured for mapping a first part of information bits in hybrid automatic repeat request acknowledgement information bits to a modulated symbol according to a predetermined constellation point mapping rule, and mapping the modulated symbol to a pilot symbol of physical uplink control channel for transmission;

The second mapping and transmission module is configured for jointly coding and mapping a second part of information bits in the hybrid automatic repeat request acknowledgement information bits and channel state information to a data symbol of physical uplink control channel for transmission.

Figure 12:
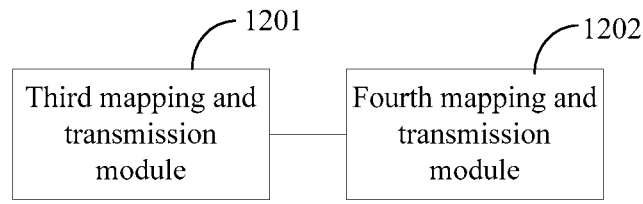
FIG. 12 is a schematic diagram of an apparatus for transmitting information on physical uplink control channel according to an embodiment of the present invention.

Another apparatus for transmitting information on physical uplink control channel is provided in the embodiments of present invention, shown in FIG. 12, the apparatus comprises: a third mapping and transmission module 1201 and the fourth mapping and transmission module 1202; wherein, The third mapping and transmission module 1201 is configured for jointly coding and mapping the channel state information and hybrid automatic repeat request acknowledgement information to the physical uplink control channel for transmitting hybrid automatic repeat request acknowledgement information for transmission, when the channel state information and hybrid automatic repeat request acknowledgement information are needed to transmit on physical uplink control channel simultaneously;

The fourth mapping and transmission module 1202 is configured for mapping the channel state information to a second physical uplink control channel for transmission, when the user equipment transmits channel state information only.

Figure 13:
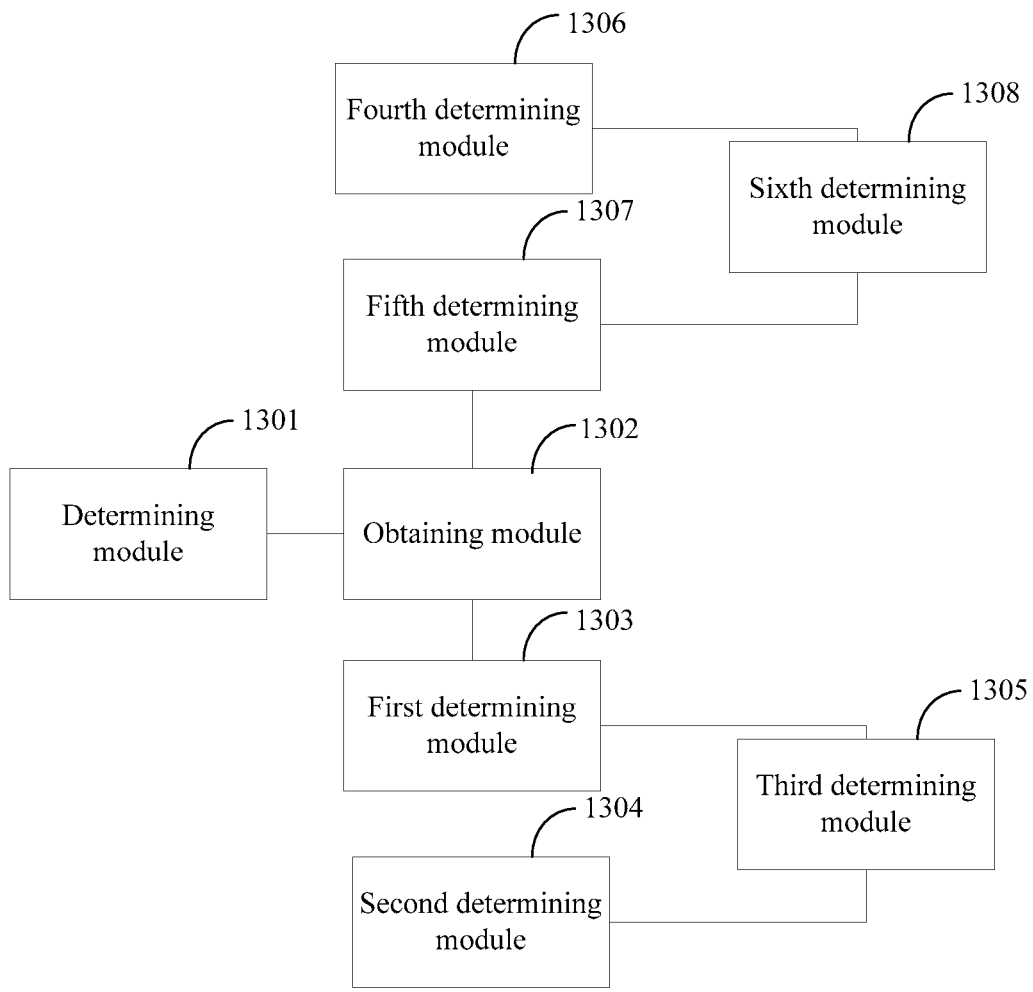
FIG. 13 is a schematic diagram of an apparatus for obtaining information transmitted on physical uplink control channel according to an embodiment of the present invention.

Another apparatus for obtaining information transmitted on physical uplink control channel is provided in the embodiments of present invention, shown in FIG. 13, the apparatus comprises: a determining module 1301 and an obtaining module 1302, wherein, The determining module 1301 is configured for determining channel state information to be detected;

The obtaining module 1302 is configured for obtaining hybrid automatic repeat request acknowledgement information, and/or scheduling request, and the determined channel state information to be detected on physical uplink control channel.

The apparatus provided in the embodiments of present invention shown in FIG. 13 realizes obtaining channel state information CSI and hybrid automatic repeat request acknowledgement information ACK/NACK simultaneously, avoids the problem of system downlink throughput decrease caused by dropping all CSI, and avoids the problem that system downlink throughput is influenced by unnecessary data retransmission on a downlink carrier caused by ACK/NACK bundling among carriers, no ACK/NACK bundling among carriers and transmitting the most important information in channel state information together with ACK/NACK not only guarantees the performance of ACK/NACK, but also acquires some channel quality information, reduces the influence on system throughput and avoids to increase extra resource overhead.

Preferably, the determining module 1301 is further configured for determining the channel state information to be detected as wideband channel quality indicator and precoding matrix indicator according to high layer parameters configured by the user equipment or preset rule; or determining the channel state information to be detected as wideband channel quality indicator according to high layer parameters configured by the user equipment or preset rule, or determining the channel state information to be detected as precoding matrix indicator according to high layer parameters configured by the user equipment or preset rule, or determining the channel state information to be detected as subband channel quality indicator and subband position indicator according to high layer parameters configured by the user equipment or preset rule, or determining the channel state information to be detected as subband channel quality indicator, subband position indicator, and precoding matrix indicator according to high layer parameters configured by the user equipment or preset rule.

The precoding matrix indication in this step can be wideband precoding matrix indication, or long-term precoding matrix indication, or subband precoding matrix indication, or short-term precoding matrix indication, or wideband precoding matrix indication and subband precoding matrix indication, or long-term precoding matrix indication and short-term precoding matrix indication.

Preferably, the obtaining module is configured for obtaining hybrid automatic repeat request acknowledgement information and the determined channel state information to be detected on physical uplink control channel, further comprises:

Obtaining a first part of hybrid automatic repeat request acknowledgement information on a pilot symbol of physical uplink control channel, and obtaining the determined channel state information to be detected and a second part of hybrid automatic repeat request acknowledgement information on a data symbol of physical uplink control channel;

Or, further comprises:

utilizing different orthogonal spreading code to perform time domain dispreading on a pilot symbol of physical uplink control channel, and determining the orthogonal spreading code used by an user;

based on the orthogonal spreading code used by the user, determining whether only the channel state information is transmitted or both of the determined channel state information to be detected and hybrid automatic repeat request acknowledgement information are simultaneously transmitted on the physical uplink control channel for transmitting the channel state information;

when it is determined that the determined channel state information to be detected and hybrid automatic repeat request acknowledgement information are transmitted simultaneously, performing channel decoding on the data transmitted on a data symbol of the physical uplink control channel for transmitting the channel state information, and reading the determined channel state information to be detected and hybrid automatic repeat request acknowledgement information according to a preset ordering rule;

Or, further comprises:

performing channel decoding on the data transmitted on a data symbol of the physical uplink control channel for transmitting hybrid automatic repeat request acknowledgement information, and reading the determined channel state information to be detected and hybrid automatic repeat request acknowledgement information according to a preset ordering rule;

Preferably, the apparatus further comprises: a first determining module 1303, a second determining module 1304, and a third determining module 1305; wherein, The first determining module is configured for determining whether hybrid automatic repeat request acknowledgement information and the determined channel state information to be detected should be included in the information transmitted on physical uplink control channel for transmitting hybrid automatic repeat request acknowledgement information;

The second determining module is configured for determining whether the determined channel state information and hybrid automatic repeat information are read on physical uplink control channel for transmitting hybrid automatic repeat request acknowledgement information;

The third determining module is configured for determining the discontinuous transmission of hybrid automatic repeat request acknowledgement information is occurred when it is determined that hybrid automatic repeat information and the determined channel state information to be detected should be included in the information transmitted on physical uplink control channel for transmitting hybrid automatic repeat request acknowledgement information, and the determined channel state information and hybrid automatic repeat information are read on physical uplink control channel for transmitting hybrid automatic repeat request acknowledgement information.

Preferably, the apparatus further comprises: a fourth determining module 1306, a fifth determining module 1307, and a sixth determining module 1308; wherein, The fourth determining module is configured for determining whether hybrid automatic repeat request acknowledgement information and the channel state information should be included in the received information transmitted on physical uplink control channel;

The fifth determining module is configured for determining whether hybrid automatic repeat information can be obtained on a pilot symbol of physical uplink control channel;

The sixth determining module is configured for determining the discontinuous transmission of hybrid automatic repeat request acknowledgement information is occurred when it is determined that hybrid automatic repeat information and the channel state information should be included in received information transmitted on physical uplink control channel, and hybrid automatic repeat information can not be obtained on a pilot symbol of physical uplink control channel;

Another apparatus for obtaining information transmitted on physical uplink control channel is provided in the embodiments of present invention, the apparatus comprises: a first obtaining module and a second obtaining module;

The first obtaining module is configured for obtaining a first part of information bits in hybrid automatic repeat request acknowledgement information bits on a pilot symbol of physical uplink control channel;

The second obtaining module is configured for obtaining channel state information and a second part of information bits in hybrid automatic repeat request acknowledgement information bits on a data symbol of physical uplink control channel.

Another apparatus for obtaining information transmitted on physical uplink control channel is provided in the embodiments of present invention, the apparatus comprises: a determining module, a third obtaining module and a fourth obtaining module;

The determining module is configured for determining whether channel state information and hybrid automatic repeat request acknowledgement information are simultaneously transmitted by a user equipment, The third obtaining module is configured for obtaining the channel state information and hybrid automatic repeat request acknowledgement information on the first physical uplink control channel, when it is determined that the channel state information and hybrid automatic repeat request acknowledgement information are simultaneously transmitted by the user equipment;

The fourth obtaining module is configured for obtaining the channel state information on the second physical uplink control channel when it is determined that only the channel state information is transmitted by the user equipment;

Wherein the first physical uplink control channel is the physical uplink control channel allocated to the user equipment by a base station or network for transmitting hybrid automatic repeat request acknowledgement information, and the second physical uplink control channel is the physical uplink control channel allocated to the user equipment by the base station or network for transmitting the channel state information.

More explanation about FIG. 8, FIG. 9, FIG. 10, FIG. 11, FIG. 12, and FIG. 13 can be referred to the explanation of method embodiments.

Persons skilled with ordinary knowledge in the art should understand that all or part of the steps of the method under the present invention may be implemented by relevant hardware under instruction of a program. The program may be stored in a computer readable storage medium. When the program runs, the steps of the method specified in any of the embodiments above can be performed. The storage medium may be a magnetic disk, a Compact Disk-Read Only Memory (CD-ROM), a Read Only Memory (ROM), or a Random Access Memory (RAM), etc.

Described above are embodiments of the present invention. Although the present invention is described through some exemplary embodiments, the present invention is not limited to such embodiments. It is apparent that persons skilled in the art can make modifications and variations to the present invention without departing from the spirit and scope of the present invention. The present invention is intended to cover the modifications and variations provided that they fall in the scope of protection defined by the following claims or their equivalents.

What is claimed is:

1. A method for transmitting information on a physical uplink control channel, the method comprising:
   selecting channel state information; and
   determining whether to transmit the selected channel state information and hybrid automatic repeat request acknowledgement information simultaneously or to transmit the selected channel state information only;
   wherein when it is determined to transmit the selected channel state information and hybrid automatic repeat request acknowledgement information simultaneously, the method further comprises jointly coding the selected channel state information and the hybrid automatic request acknowledgement information, and mapping to a first physical uplink control channel configured for transmitting hybrid automatic repeat request acknowledgement information, and then transmitting the selected channel state information on the first physical uplink control channel together with the hybrid automatic request acknowledgement information;
   when it is determined to transmit the selected channel state information only, the method further comprises: coding the selected channel state information and mapping to a second physical uplink control channel configured for transmitting channel state information, and then transmitting the selected channel state information on the second physical uplink control channel;
   wherein jointly coding the selected channel state information and hybrid automatic repeat acknowledgement information comprises:
   ordering hybrid automatic repeat request acknowledgement information bits and the selected channel state information bits according to a preset ordering rule, wherein the preset ordering rule is that the selected channel state information bits are ordered at the end of the hybrid automatic repeat acknowledgement information bits; and
   performing channel coding for the ordered information bits.

2. The method of claim 1, wherein the selecting the channel state information comprises:
selecting the channel state information among channel state information corresponding to multiple downlink carriers, and the selected channel state information corresponds to one downlink carrier.

3. The method of claim 1, wherein the selecting the channel state information comprises:
selecting channel state information according to received high layer parameters sent from a base station or according to a preset rule.

4. The method of claim 1, wherein the selecting channel state information further comprises at least one of:
(a) selecting wideband channel quality indicator and precoding matrix indicator from the channel state information,
(b) selecting wideband channel quality indicator from the channel state information,
(c) selecting precoding matrix indicator from the channel state information,
(d) selecting subband channel quality indicator and subband position indicator from the channel state information, and
selecting subband channel quality indicator, subband position indicator, and precoding matrix indicator from the channel state information.

5. A method for transmitting information on physical uplink control channel, comprising:
determining whether to transmit channel state information and hybrid automatic repeat request acknowledgement information simultaneously or to transmit the channel state information only;
when it is determined to transmit the channel state information and the hybrid automatic repeat request acknowledgement information simultaneously, jointly coding the channel state information and the hybrid automatic request acknowledgement information, and mapping to a first physical uplink control channel configured for transmitting hybrid automatic repeat request acknowledgement information, and then transmitting the channel state information and the hybrid automatic request acknowledgement information on the first physical uplink control channel;
when it is determined to transmit the channel state information only, coding the channel state information and mapping to a second physical uplink control channel configured for transmitting channel state information, and then transmitting the channel state information on the second physical uplink control channel;
wherein jointly coding the channel state information and the hybrid automatic repeat acknowledgement information further comprises:
ordering the hybrid automatic repeat request acknowledgement information bits and the channel state information bits according to a preset ordering rule, wherein the preset ordering rule is that the channel state information bits are ordered at the end of the hybrid automatic repeat acknowledgement information bits; and
performing channel coding for the ordered information bits.

6. The method of claim 5, wherein the first physical uplink control channel is explicitly notified by the base station.

7. A method for obtaining information transmitted on a physical uplink control channel, comprising:
determining channel state information to be detected;
obtaining the determined channel state information to be detected, which further comprises:
determining whether a user equipment transmits the channel state information to be detected and hybrid automatic repeat request acknowledgement information simultaneously or transmits the channel state information to be detected only;
when it is determined that the user equipment transmits the channel state information to be detected and the hybrid automatic repeat request acknowledgement information simultaneously, obtaining the determined channel state information to be detected and the hybrid automatic repeat request acknowledgement information on a first physical uplink control channel, wherein the first physical uplink control channel is a physical uplink control channel configured for the user equipment to transmit hybrid automatic repeat request acknowledgement information;
when it is determined that the user equipment transmits the channel state information to be detected only, obtaining the determined channel state information to be detected on a second physical uplink control channel, wherein the second physical uplink control channel is a physical uplink control channel configured for the user equipment to transmit channel state information;
wherein obtaining the determined channel state information to be detected and hybrid automatic repeat request acknowledgement information on a first physical uplink control channel further comprises:
obtaining the determined channel state information to be detected and hybrid automatic repeat request acknowledgement information on a first physical uplink control channel according to a preset ordering rule, wherein the preset ordering rule is that the channel state information bits are ordered at the end of the hybrid automatic repeat acknowledgement information bits.

8. The method of claim 7, wherein the determining channel state information to be detected further comprises:
determining the channel state information to be detected among channel state information corresponding to multiple downlink carriers, and the determined channel state information to be detected corresponding to one downlink carrier.

9. The method of claim 7, wherein the determining channel state information to be detected further comprises at least one of:
(a) determining the channel state information to be detected as wideband channel quality indicator and precoding matrix indicator,
(b) determining the channel state information to be detected as wideband channel quality indicator,
(c) determining the channel state information to be detected as precoding matrix indicator,
(d) determining the channel state information to be detected as subband channel quality indicator and subband position indicator, and
(e) determining the channel state information to be detected as subband channel quality indicator, subband position indicator, and precoding matrix indicator.

10. An apparatus for transmitting information on physical uplink control channel, comprising a processor and a transmitter:
the processor selects channel state information, and
the processor determining whether to transmit the selected channel state information and hybrid automatic repeat request acknowledgement information simultaneously or to transmit the selected channel state information only;
when it is determined to transmit the selected channel state information and hybrid automatic repeat request acknowledgement information simultaneously, the processor jointly codes the selected channel state information and the hybrid automatic request acknowledgement information, and maps to a first physical uplink control channel configured for transmitting hybrid automatic repeat request acknowledgement information, and then the transmitter transmits the selected channel state information on the first physical uplink control channel together with the hybrid automatic request acknowledgement information;
when it is determined to transmit the selected channel state information only, the processor codes the selected channel state information and maps to a second physical uplink control channel configured for transmitting channel state information, and then the transmitter transmits the selected channel state information on the second physical uplink control channel;
wherein the processor further orders hybrid automatic repeat request acknowledgement information bits and the channel state information bits according to a preset ordering rule, wherein the preset ordering rule is a rule that channel state information bits are ordered at the end of the hybrid automatic repeat acknowledgement information bits; and performs channel coding for the ordered information bits.

11. The apparatus of claim 10, wherein the processor selecting the channel state information comprises:
the processor selects the channel state information among the channel state information corresponding to multiple downlink carriers, and the selected channel state information corresponds to one downlink carrier.

12. The apparatus of claim 10, wherein the processor selects information from the channel state information according to received high layer parameters sent from a base station or according to a preset rule.

13. The apparatus of claim 10, wherein the processor selects information from channel state information further comprises at least one of: the processor
(a) selects wideband channel quality indicator and precoding matrix indicator from the channel state information,
(b) selects wideband channel quality indicator from the channel state information,
(c) selects precoding matrix indicator from the channel state information,
(d) selects subband channel quality indicator and subband position indicator from the channel state information,
(e) selects subband channel quality indicator, subband position indicator, and precoding matrix indicator from the channel state information.

14. An apparatus for transmitting information on a physical uplink control channel, comprising a processor and a transmitter:
wherein the processor determines whether to transmit channel state information and hybrid automatic repeat request acknowledgement information simultaneously or to transmit the channel state information only;
when it is determined to transmit the channel state information and the hybrid automatic repeat request acknowledgement information simultaneously, the processor jointly codes the channel state information and the hybrid automatic request acknowledgement information, and maps to a first physical uplink control channel configured for transmitting hybrid automatic repeat request acknowledgement information, and then the transmitter transmits the channel state information and the hybrid automatic request acknowledgement information on the first physical uplink control channel;
when it is determined to transmit the channel state information only, the processor codes the channel state information and maps to a second physical uplink control channel configured for transmitting channel state information, and then the transmitter transmits the channel state information on the second physical uplink control channel;
wherein the processor is further configured for:
ordering the hybrid automatic repeat request acknowledgement information bits and the channel state information bits according to a preset ordering rule, wherein the preset ordering rule is a rule that channel state information bits are ordered at the end of the hybrid automatic repeat acknowledgement information bits; and
performing channel coding for the ordered information bits.

15. The apparatus of claim 14, wherein the first physical uplink control channel is explicitly notified by the base station.

16. An apparatus for obtaining information transmitted on physical uplink control channel, comprising:
a processor, configured to determine channel state information to be detected, obtain the determined channel state information to be detected on a physical uplink control channel, and obtain one or both of hybrid automatic repeat request acknowledgement information and scheduling request on the physical uplink control channel, wherein
the processor determines whether a transmission requires simultaneous transmission of selected channel state information and hybrid automatic repeat request acknowledgement information simultaneously,
upon the determination that the transmission requires simultaneous transmission, the processor obtains the determined channel state information and hybrid automatic repeat request acknowledgement information on a first physical uplink control channel, wherein the first physical uplink control channel is a physical uplink control channel allocated to the user equipment for transmitting hybrid automatic repeat request acknowledgement information,
upon determination that the transmission does not require simultaneous transmission, the processor obtains the determined channel state information on a second physical uplink control channel, wherein the second physical uplink control channel is a physical uplink control channel allocated to the user equipment for transmitting channel state information;
wherein the processor further obtains the determined channel state information and hybrid automatic repeat request acknowledgement information on a first physical uplink control channel according to a preset ordering rule, wherein the preset ordering rule is that the channel state information bits are ordered at the end of the hybrid automatic repeat acknowledgement information bits.

17. The apparatus of claim 16, wherein:
the channel state information to be detected corresponds to one downlink carrier when the channel state information to be reported by a user equipment corresponds to multiple downlink carriers.

18. The apparatus of claim 16, wherein the processor further determines whether hybrid automatic repeat information and the determined channel state information to be detected should be included in the information transmitted on physical uplink control channel for transmitting hybrid automatic repeat request acknowledgement information.

19. The apparatus of claim 16, the processor determines one of the following:
whether the hybrid automatic repeat request acknowledgement information and the channel state information should be included in the received information transmitted on the physical uplink control channel;
whether the hybrid automatic repeat request acknowledgement information can be obtained on a pilot symbol of the physical uplink control channel;
discontinuous transmission of the hybrid automatic repeat request acknowledgement information when it is determined that the hybrid automatic repeat request acknowledgement information and the channel state information should be included in the received information transmitted on the physical uplink control channel, and the hybrid automatic repeat request acknowledgement information cannot be obtained on a pilot symbol of physical uplink control channel.

20. The apparatus of claim 16, wherein the processor determines channel state information to be detected further comprises at least one of: the processor
   (a) determines the channel state information to be detected as wideband channel quality indicator and precoding matrix indicator,
   (b) determines the channel state information to be detected as wideband channel quality indicator,
   (c) determines the channel state information to be detected as precoding matrix indicator,
   (d) determines the channel state information to be detected as subband channel quality indicator and subband position indicator, and
   (e) determines the channel state information to be detected as subband channel quality indicator, subband position indicator, and precoding matrix indicator.

\* \* \* \* \*